US008164772B2

(12) United States Patent
Watanabe

(10) Patent No.: US 8,164,772 B2
(45) Date of Patent: Apr. 24, 2012

(54) IMAGE FORMING APPARATUS AND IMAGE FORMING METHOD

(75) Inventor: Taisuke Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1081 days.

(21) Appl. No.: 11/059,738

(22) Filed: Feb. 17, 2005

(65) Prior Publication Data

US 2005/0185219 A1 Aug. 25, 2005

(30) Foreign Application Priority Data

Feb. 19, 2004 (JP) ................................ 2004-042994

(51) Int. Cl.
*G06F 15/00* (2006.01)

(52) U.S. Cl. ...... 358/1.15; 358/1.1; 358/1.13; 358/1.14; 358/1.16

(58) Field of Classification Search ................ 358/1.15, 358/1.16, 1.14
See application file for complete search history.

(56) References Cited

U.S. PATENT DOCUMENTS 6,091,508 A * 7/2000 Love et al. .................. 358/1.15
7,246,348 B1 * 7/2007 Mixer, Jr. ..................... 717/168
2002/0002604 A1 * 1/2002 Nomura et al. ............... 709/219
2002/0101611 A1 * 8/2002 Shima .......................... 358/1.15
2003/0035672 A1 * 2/2003 Kidani et al. .................. 400/74
2003/0137684 A1 * 7/2003 Osada .......................... 358/1.13
2003/0231333 A1 * 12/2003 Nakamura et al. ........... 358/1.14
2004/0117784 A1 * 6/2004 Endoh .......................... 717/169

FOREIGN PATENT DOCUMENTS

JP 05-066937 A 3/1993
JP 6162008 A 6/1994
JP 2001-067214 A 3/2001
JP 2003174618 A 6/2003

* cited by examiner

*Primary Examiner* — Chan S Park
*Assistant Examiner* — Kent Yip
(74) *Attorney, Agent, or Firm* — Panitch Schwarze Belisario & Nadel LLP

(57) ABSTRACT

What is disclosed is an image forming apparatus which is able to execute an auxiliary program combined to a prescribe control program that transforms a piece of received information to an image data wherein the image forming apparatus comprising: a memory section for containing said auxiliary program; a received information judging section for judging whether the received information is said auxiliary program or a piece of image information, by analyzing said received information; and an auxiliary program managing section for detecting from said memory section an auxiliary program necessary for the received information to be processed, based on the image information, when said received information is the image information.

17 Claims, 18 Drawing Sheets

SAMPLE

FIG.6

@COMPRESSED='
+−1h5−@ ミ ヨxヒ. ･M @ 5H + T /
,サ エリu轣EQノ,モム1
c。*ェサーコ･ヒ＝5ロ~9･＝館 '

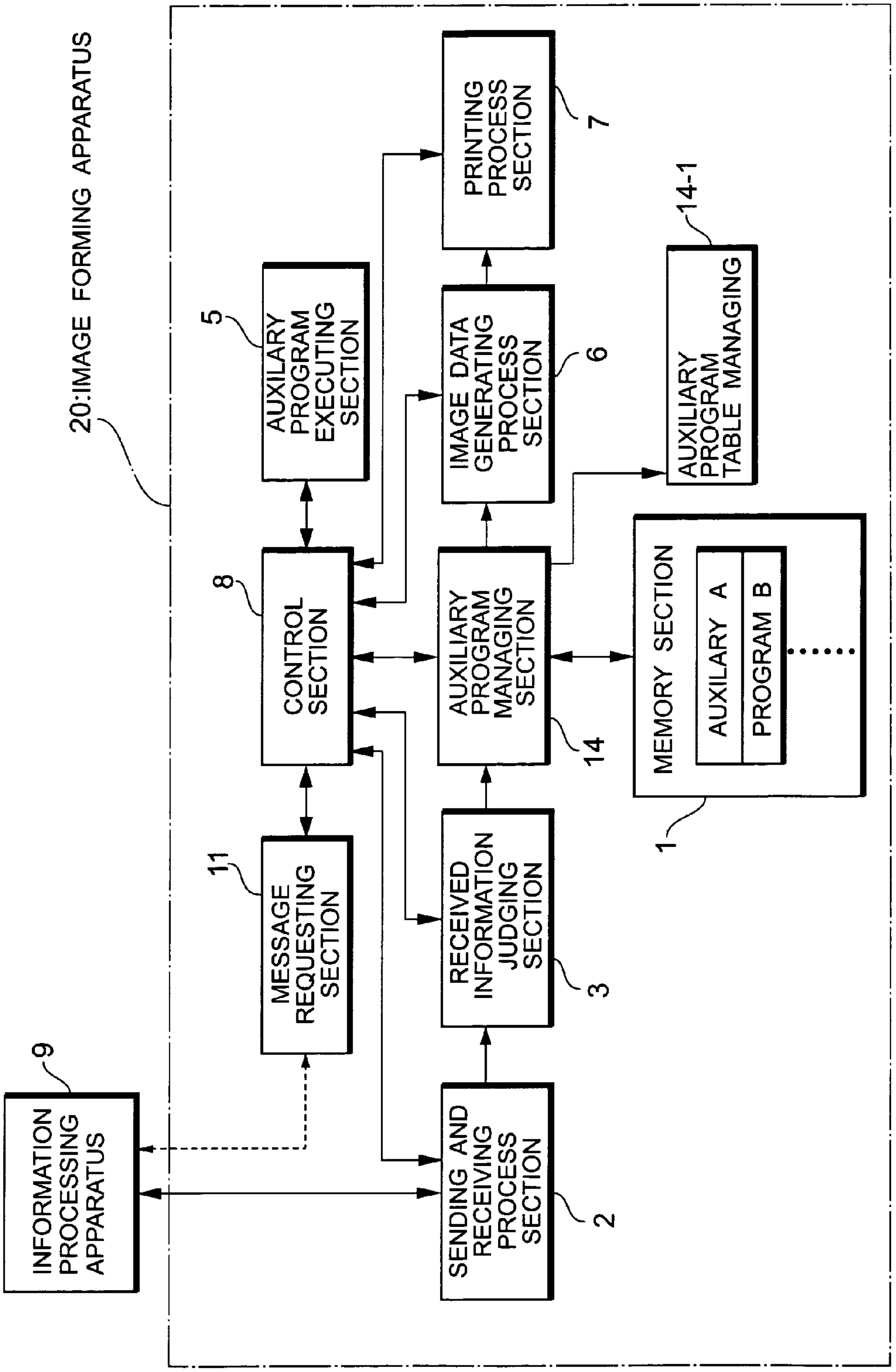

FIG. 8
20:IMAGE FORMING APPARATUS
9
INFORMATION PROCESSING APPARATUS
2
SENDING AND RECEIVING PROCESS SECTION
11
MESSAGE REQUESTING SECTION
3
RECEIVED INFORMATION JUDGING SECTION
8
CONTROL SECTION
14
AUXILIARY PROGRAM MANAGING SECTION
1
MEMORY SECTION
AUXILARY A
PROGRAM B
5
AUXILARY PROGRAM EXECUTING SECTION
6
IMAGE DATA GENERATING PROCESS SECTION
7
PRINTING PROCESS SECTION
14-1
AUXILIARY PROGRAM TABLE MANAGING

FIG. 9

| IDENTIFIER OF AUXILIARY PROGRAM | ADDRESS OF AUXILIARY PROGRAM |
|---|---|
| APPLICATION B | 0x864208 |
| | |
| | |
| | |

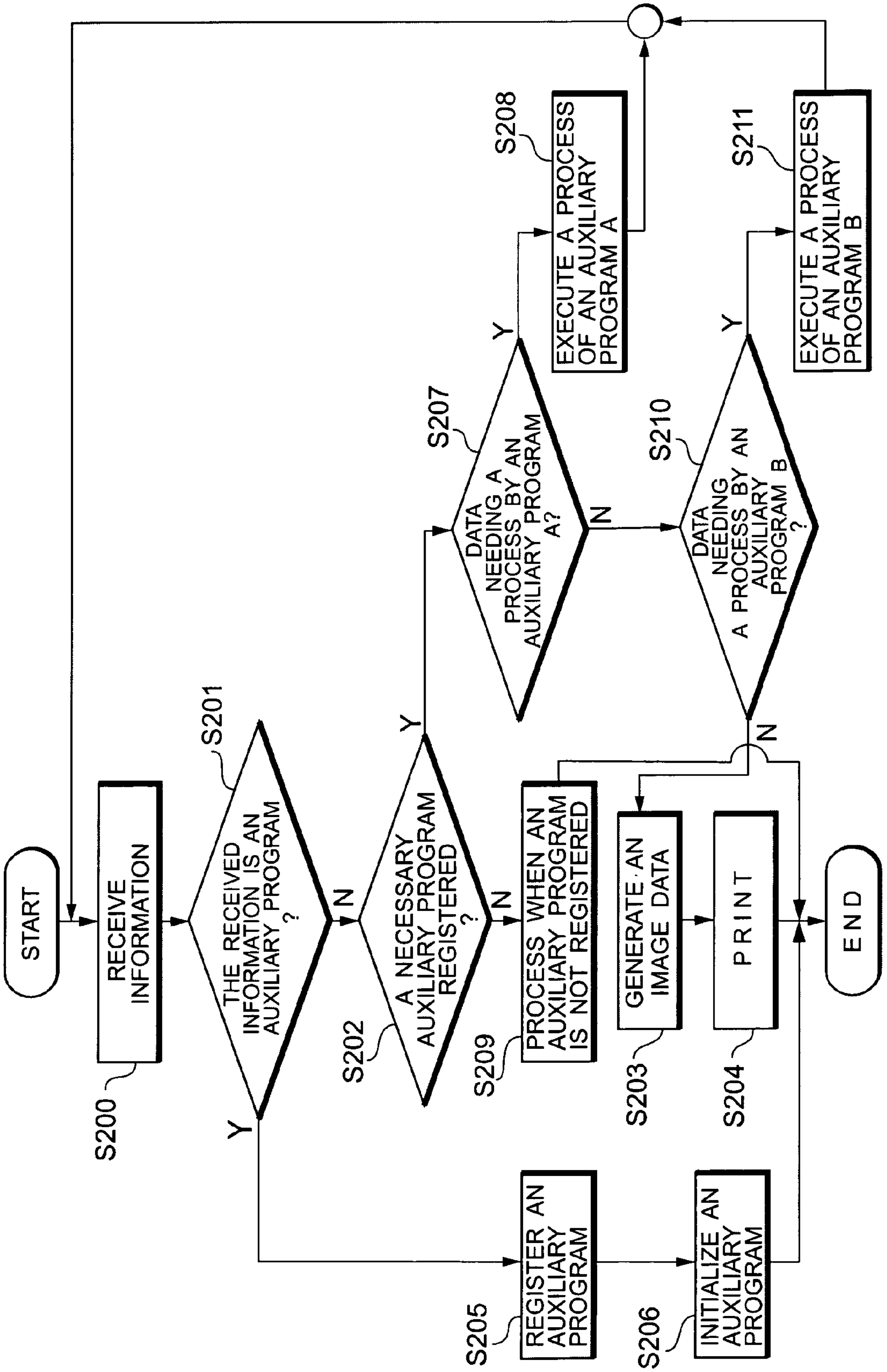

FIG. 10
START
S200
RECEIVE INFORMATION
S201
THE RECEIVED INFORMATION IS AN AUXILIARY PROGRAM ?
Y
N
S202
A NECESSARY AUXILIARY PROGRAM REGISTERED ?
Y
N
S205
REGISTER AN AUXILIARY PROGRAM
S206
INITIALIZE AN AUXILIARY PROGRAM
S209
PROCESS WHEN AN AUXILIARY PROGRAM IS NOT REGISTERED
S203
GENERATE AN IMAGE DATA
S204
PRINT
END
S207
DATA NEEDING A PROCESS BY AN AUXILIARY PROGRAM A?
Y
N
S208
EXECUTE A PROCESS OF AN AUXILIARY PROGRAM A
S210
DATA NEEDING A PROCESS BY AN AUXILIARY PROGRAM B ?
Y
N
S211
EXECUTE A PROCESS OF AN AUXILIARY PROGRAM B

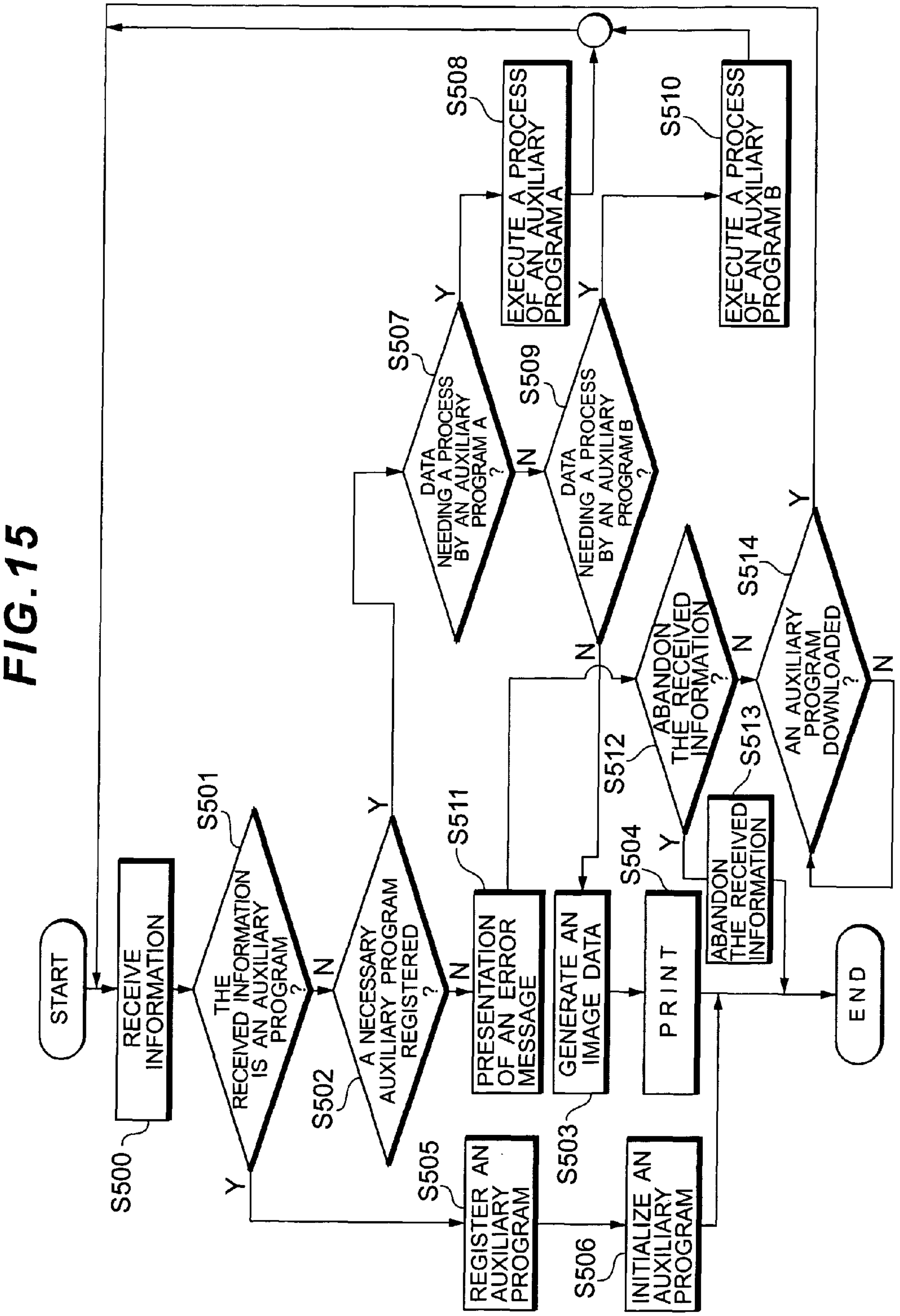

FIG. 15
START
S500
RECEIVE INFORMATION
S501
THE RECEIVED INFORMATION IS AN AUXILIARY PROGRAM ?
Y
N
S502
A NECESSARY AUXILIARY PROGRAM REGISTERED ?
S505
REGISTER AN AUXILIARY PROGRAM
S506
INITIALIZE AN AUXILIARY PROGRAM
S511
PRESENTATION OF AN ERROR MESSAGE
S503
GENERATE AN IMAGE DATA
S504
PRINT
END
S507
DATA NEEDING A PROCESS BY AN AUXILIARY PROGRAM A ?
S508
EXECUTE A PROCESS OF AN AUXILIARY PROGRAM A
S509
DATA NEEDING A PROCESS BY AN AUXILIARY PROGRAM B ?
S510
EXECUTE A PROCESS OF AN AUXILIARY PROGRAM B
S512
ABANDON THE RECEIVED INFORMATION ?
S513
ABANDON THE RECEIVED INFORMATION
S514
AN AUXILIARY PROGRAM DOWNLOADED ?

START
RECEIVE INFORMATION
S800
S801
THE RECEIVED INFORMATION IS AN AUXILIARY PROGRAM?
Y
N
S802
AN AUXILIARY PROGRAM EXISTS ?
Y
N
S803
GENERATE AN IMAGE DATA
S804
PRINT
END
S805
PROCESS OF ADDING AN AUXILIARY PROGRAM
S806
DATA NEEDING A PROCESS BY AN AUXILIARY PROGRAM A ?
Y
N
S807
EXECUTE A PROCESS OF AN AUXILIARY PROGRAM A

START
RECEIVE INFORMATION
S900
S901
THE RECEIVED INFORMATION IS AN AUXILIARY PROGRAM?
Y
N
S902
AN AUXILIARY PROGRAM REGISTERED ?
Y
N
S906
DATA NEEDING A PROCESS BY AN AUXILIARY PROGRAM A?
Y
N
S907
EXECUTE A PROCESS OF AN AUXILIARY PROGRAM A
RENEW AN AUXILIARY PROGRAM MANAGING TABLE
S908
GENERATE AN IMAGE DATA
S903
S904
PRINT
END
S905
PROCESS OF ADDING AN AUXILIARY PROGRAM

| IDENTIFIER OF AN AUXILIARY PROGRAM | EXECUTING ADDRESS OF AN AUXILIARY PROGRAM | THE NUMBER OF TIMES OF USING AN AUXILIARY PROGRAM |
|---|---|---|
| APPLICATION A | 0x987654 | 5 |
| APPLICATION B | 0x864208 | 1 |
| ⋮ | ⋮ | ⋮ |
| | | |

IMAGE FORMING APPARATUS AND IMAGE FORMING METHOD

BACKGROUND OF THE INVENTION

1. Field of the Invention

The present invention relates to an image forming apparatus and an image forming method which are able to execute an auxiliary program combined to a prescribe control program that transforms a piece of received information to an image data.

2. Description of Related Art

In an image forming apparatus, for responding a request from a specific client, or for correcting inconveniences etc., a case occurs that a renewal of a control program or addition of a new program is requested. In such case, hitherto, ordinarily, a service staff went to a place where an image forming apparatus is installed. And, the staff performed a operation of changing a program. Therefore, there were problems remained to be solved, which are a problem that much time and labor are needed to perform an operation of changing a program, a problem that the current program must be changed for adding new functions, a problem that changing or adding a great deal of functions in accord with functions of the current program, is difficult.

As a technique to solve partially a problem that much time and labor are needed, for example, disclosed is a technique with a method of using a wireless communicating means that a service staff can perform an operation without breaking and assembling the image forming apparatus (c.f. JP5-66937). Or, disclosed is a technique that a service staff changes a part of a control program of an image forming apparatus, without stopping operations of the other parts of the control program of the image forming apparatus (JP2001-67214).

The problems to be solved by the present invention, are a problem that the current program must be changed for adding new functions, and a problem that changing or adding a great deal of functions in accord with functions of the current program, is difficult.

SUMMARY OF THE INVENTION

According to one aspect of the present invention, there is provided an image forming apparatus which is able to execute an auxiliary program combined to a prescribe control program that transforms a piece of received information to an image data wherein the image forming apparatus comprising: a memory section for containing said auxiliary program; a received information judging section for judging whether the received information is said auxiliary program or a piece of image information, by analyzing said received information; and an auxiliary program managing section for detecting from said memory section an auxiliary program necessary for the received information to be processed, based on the image information, when said received information is the image information.

According to another aspect of the present invention, there is provided an image forming method which performs an image forming with a control program wherein the image forming method comprising steps of: receiving a piece of information from a host device; detecting an auxiliary program necessary for the received information to be processed, based on an identifying information included in the image information, when said received information is the image information; making a combined program made by combining said auxiliary program and said control program; and forming an image from said received information with using said combined program.

BRIEF DESCRIPTION OF THE DRAWINGS

FIG. 3 is an example of a piece of received information;

FIG. 4 is an example of an image transformed and generated from the received information;

FIG. 6 is an example of a piece of image information which needs a process performed by an auxiliary program A;

FIG. 8 is a block diagram showing a configuration of Embodiment 2;

FIG. 9 is an example of an auxiliary program management table of Embodiment 2;

FIG. 10 is a flow chart showing a process of a main operation of Embodiment 2;

FIG. 15 is a flow chart showing a process of an operation of Embodiment 3;

DESCRIPTION OF THE PREFERRED EMBODIMENTS

Embodiment 1

Configuration

Figure 1:
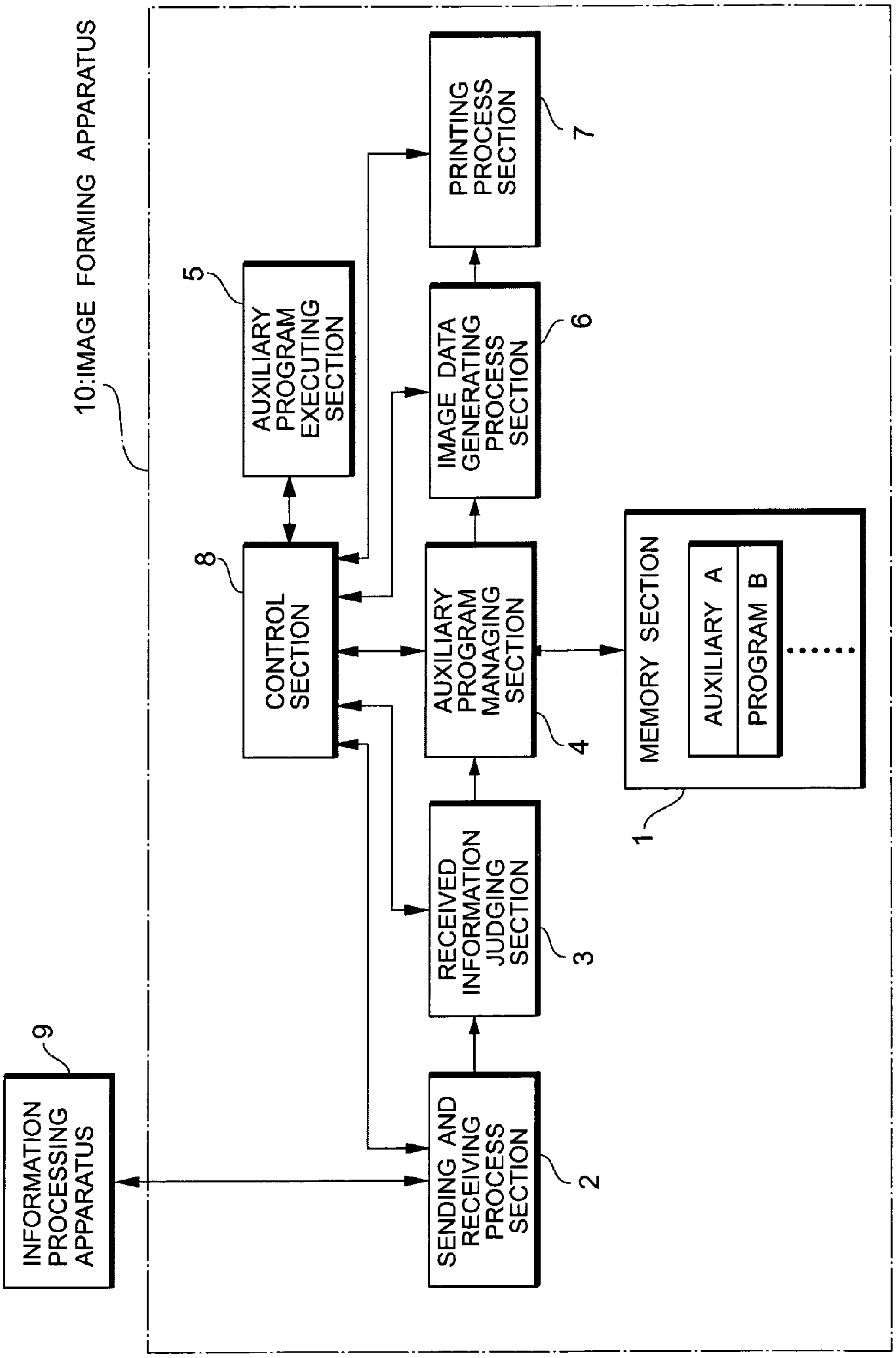
FIG. 1 is a block diagram showing a configuration of Embodiment 1.

FIG. 1 is a block diagram showing a configuration of Embodiment 1.

As shown in FIG. 1, an image forming apparatus 10 of Embodiment 1, comprises a memory section 1, a sending and receiving process section 2, a received information judging section 3, an auxiliary program managing section 4, an auxiliary program executing section 5, an image data generating process section 6, a printing process section 7, and a control section 8.

The memory section 1 is a section where an auxiliary program A, an auxiliary program B etc. are registered. The memory section 1 is a memory device for containing information necessary for an overall control of the image forming apparatus 10. And, inside of the memory section 1, memory regions for registering an auxiliary program A, an auxiliary program B etc. are secured. However, the memory section 1 can be a specific memory for containing an auxiliary program A, an auxiliary program B etc. which is newly provided. The auxiliary program A, the auxiliary program B etc. are control programs for renewing programs which are installed when the image forming apparatus 10 is installed, or for adding new functions.

These auxiliary programs will be described in detail later in a description of an operation. However, as describing an example of them here, in case that there is an identifier "@COMPRESSED" in the received information, the received information is judged as a piece of compressed information. Then, the image data generating process section 6 expands the received information, so as to transform it into a formulus which is able to be processed. For this purpose, for example, the auxiliary program A is used. Moreover, as describing another example of them here, in case that there is an identifier "@CONFIDENTIAL" in the received information, the received information is judged as a piece of image information which needs combination of water marks. Then, the image data generating process section 6 transforms the received information into a formulus which is able to combine water marks. For this purpose, for example, the auxiliary program B is used. However, these functions of the auxiliary programs are not limited to these examples. Moreover, the number of the auxiliary programs, is not limited.

The sending and receiving process section 2 is a section for performing a process of sending and receiving the information with an information processing apparatus 9, based on a control of the control section 8.

The received information judging section 3 is a section for analyzing the received information, based on a control of the control section 8. As an example, in case that there is an identifier "@PROGRAM" in a header of the received information, the received information is judged as a program. Otherwise, the received information is judged as a piece of image information.

The auxiliary program managing section 4 is a section for managing the auxiliary programs. When it received a piece of image information, based on a control of the control section 8, it recognize an auxiliary program needed for the image information. Then, it searches the memory section 1 for the auxiliary program recognized, so as to add the auxiliary program to a prescribed control program. That is, when the auxiliary program managing section 4 detected the auxiliary program recognized, it enables the auxiliary program executing section to execute a necessary auxiliary program before the prescribed control program is executed. Moreover, when the sending and receiving process section 2 received the sending and receiving process section 2 with requesting a new registration, from the information processing apparatus 9, the auxiliary program managing section 4 sets the name of the registered auxiliary program inside of the auxiliary program managing section 4, together with registering auxiliary program in the memory section 1, so as to perform an initialization. Here, a prescribed control program is a program already installed before a renewal of programs or addition of new functions are requested.

The auxiliary program executing section 5 is a section for executing a necessary auxiliary program, based on a control of the control section 8, when the auxiliary program managing section 4 detected said auxiliary program from the memory section 1. Then, the auxiliary program executing section 5 sends the executed image information again to the received information judging section 3.

The image data generating process section 6 is a section for transforming a piece of image information into an image data which is able to be printed by a printing process section 7, based on a control of the control section 8, after receiving the image information and analyzing character codes included in it. However, in case that the auxiliary program managing section 4 recognized an auxiliary program needed for the transforming process and it could detect the needed auxiliary program from the memory section 1, the transforming process is performed after the auxiliary program was executed by the auxiliary program executing section 5. The program executed by the image data generating process section 6, corresponds to the prescribed program mentioned above.

The printing process section 7 is a section for executing a printing process, based on a control of the control section 8, after receiving an image data from the image data generating process section 6.

The control section 8 is a CPU (Central Processing Unit) for performing an overall control of the apparatus. All of the above mentioned sending and receiving process section 2, the received information judging section 3, the auxiliary program managing section 4, the auxiliary program executing section 5, and the image data generating process section 6; or any of them; can comprise a controlling means which operates by a program contained in the memory section 1 beforehand. Or, it can comprise a specific electronic circuit.

Operation

An operation of Embodiment 1 will be described.

Figure 2:
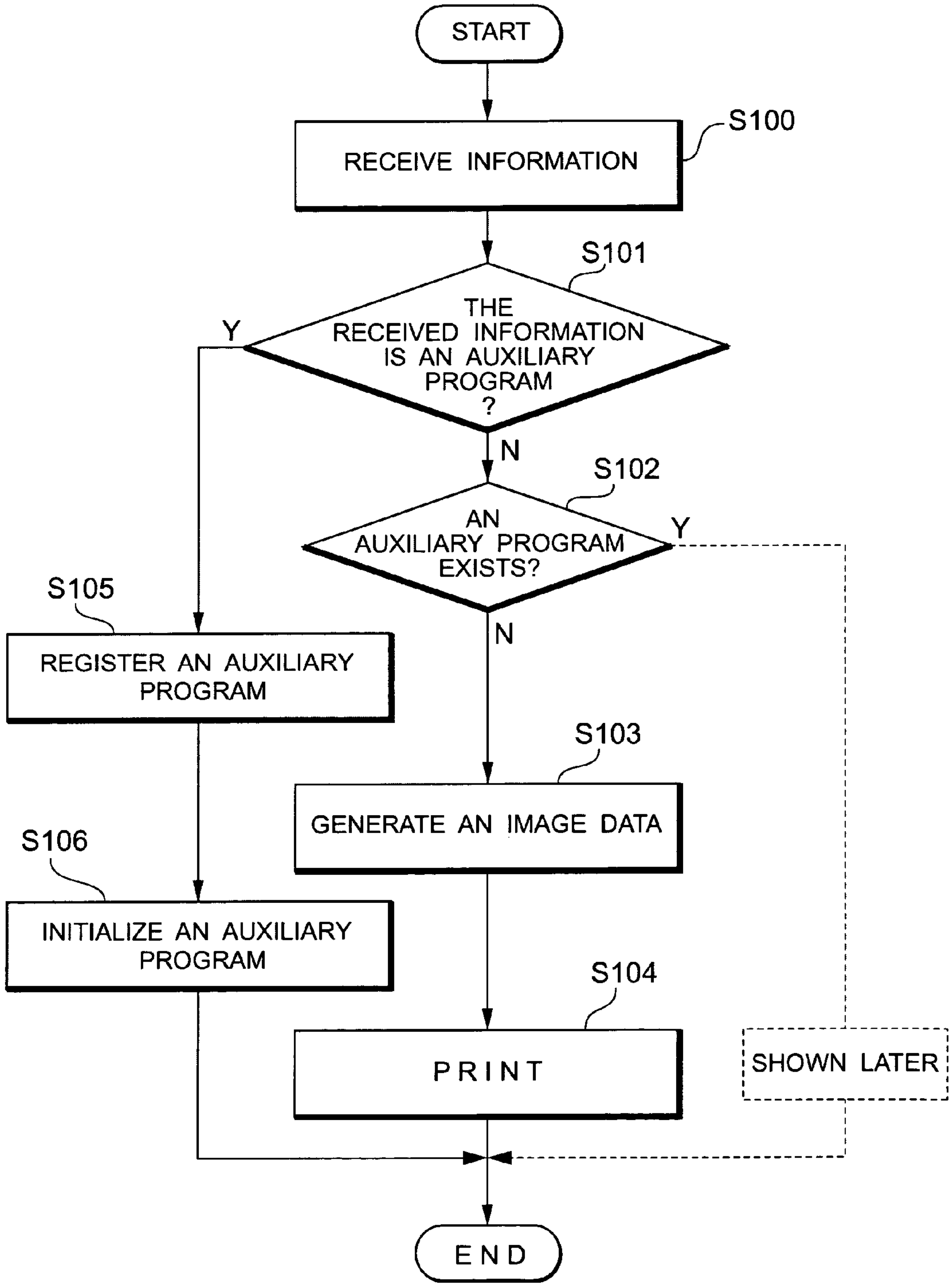
FIG. 2 is a flow chart showing a process of Embodiment 1 performed when an auxiliary program is not registered.

FIG. 2 is a flow chart showing a process of Embodiment 1 performed when an auxiliary program is not registered.

Figures 3, 4, 6:
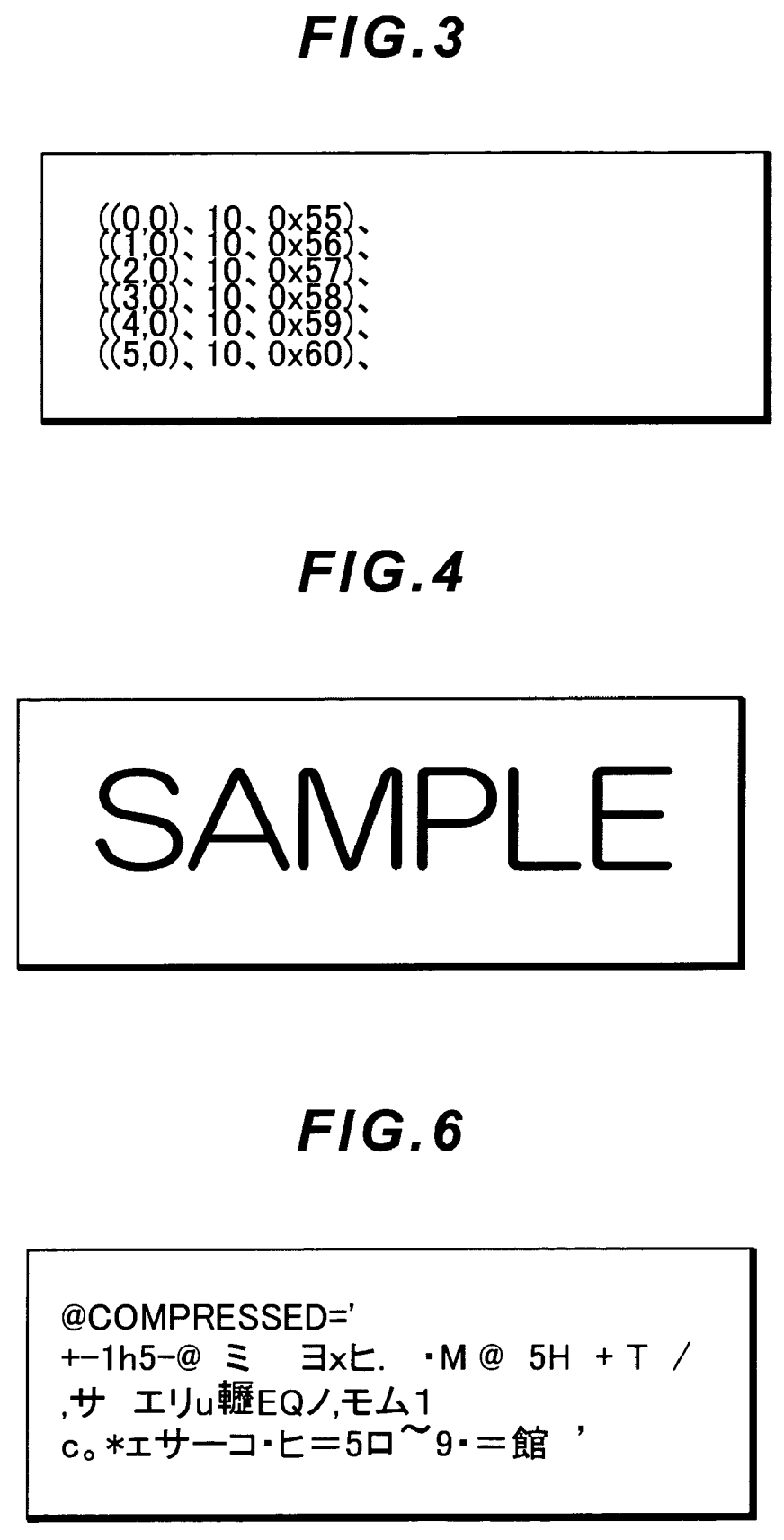

FIG. 3 is an example of a piece of received information.

FIG. 4 is an example of an image transformed and generated from the received information.

The flow chart of FIG. 2 is showing an operation in case that a piece of information shown in FIG. 3 is sent from the information processing apparatus 9 when an auxiliary program is not registered in the memory section 1.

Step S100

The sending and receiving process section 2 receives a piece of information shown in FIG. 3 from the information processing apparatus 9, based on a control of the control section 8.

Step S101

The received information judging section 3 judges whether the received information is a piece of image information or an auxiliary program, based on a control of the control section 8, after receiving the information from the sending and receiving process section 2. In case that the received information is a piece of image information, the process proceeds to STEP S102. In case that the received information is an auxiliary program, the process proceeds to STEP S105.

A method for judging whether the received information is a piece of image information or an auxiliary program, is not limited to a specific method on purpose. However, as an example, in case that there is an identifier "@PROGRAM" in a header of the received information, the received information is judged as a program. Otherwise, the received information is judged as a piece of image information. Here, the process proceeds to STEP S102, because an identifier "@PROGRAM" is not included in the received information shown in FIG. 3.

Step S102

When the received information judging section 3 judged that the received information is a piece of image information, the auxiliary program managing section 4 judges whether there is any auxiliary program already registered in the memory section 1 or not, based on a control of the control section 8. In the present case, any auxiliary program is not registered. Therefore, the process proceeds to the next step. In case that the auxiliary program managing section 4 judged that there is an auxiliary program registered in the memory section 1, the process proceeds along a doted line to a process to be mentioned later.

Step S103

When the image data generating process section 6 received a piece of image information from the auxiliary program managing section 4, it transforms the image information into an image data, with using a prescribed program, based on a control of the control section 8.

Step S104

The printing process section 7 performs a printing process, based on a control of the control section 8, after receiving an image data from the image data generating process section 6. And, the process ends. Here, an example of an image printed out in the present case, is shown in FIG. 4.

Step S105

Even if an identifier "@PROGRAM" is included in the received information, the auxiliary program managing section 4, based on a control of the control section 8, registers the auxiliary program in the memory section 1, and sets the name of the program in itself.

Step S106

The auxiliary program managing section 4 initializes the auxiliary program, based on a control of the control section 8, and the process ends.

Figure 5:
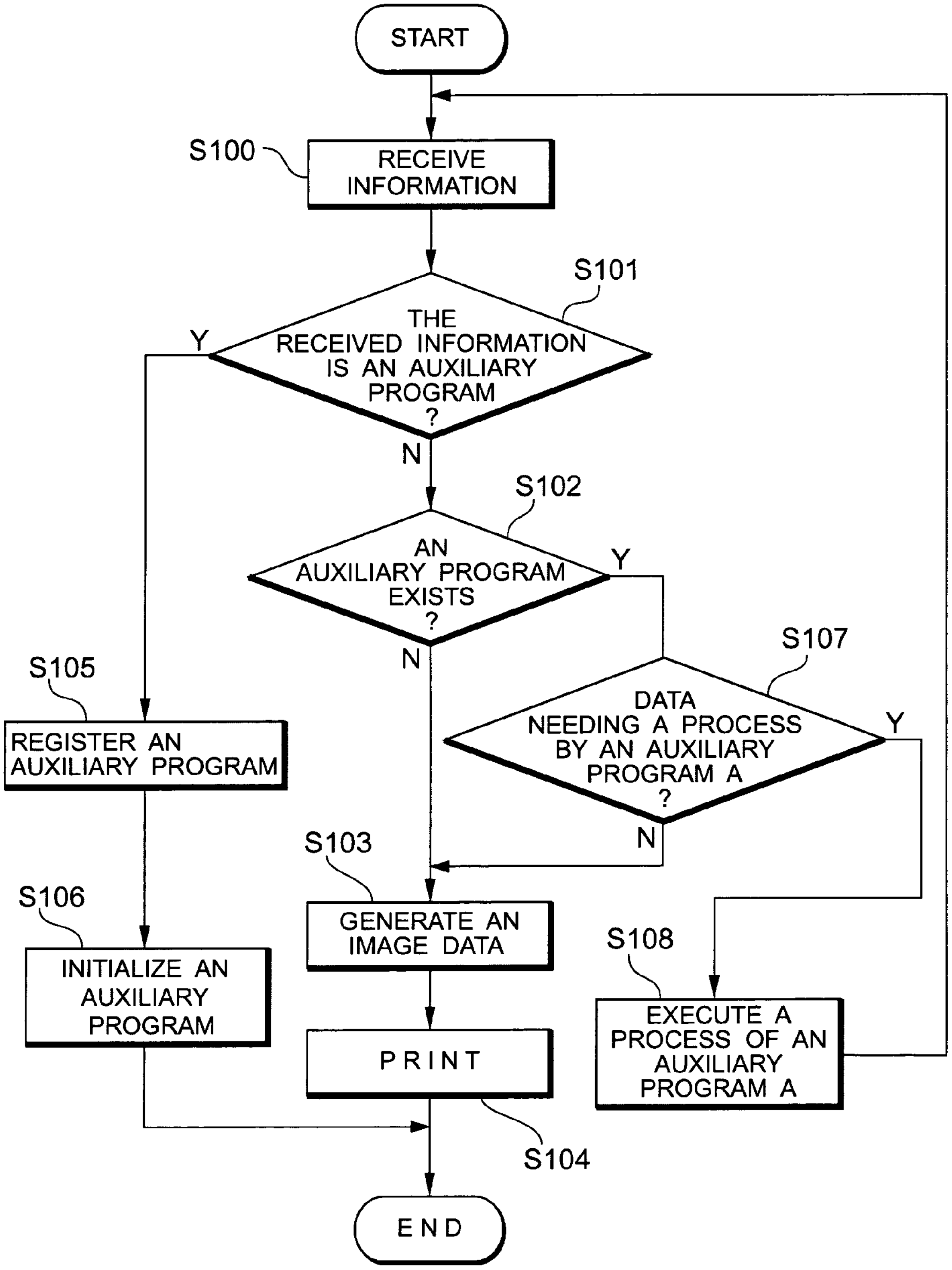
FIG. 5 is a flow chart showing a process of Embodiment 1 performed when an auxiliary program A is registered.

FIG. 5 is a flow chart showing a process of Embodiment 1 performed when an auxiliary program A is registered.

FIG. 6 is an example of a piece of image information which needs a process performed by an auxiliary program A.

The flow chart of FIG. 5 is showing an operation in case that an auxiliary program A is already registered in the memory section 1.

Step S100

The sending and receiving process section 2 receives a piece of information shown in FIG. 6 from the information processing apparatus 9, based on a control of the control section 8.

Step S101

The received information judging section 3 judges whether the received information is a piece of image information or an auxiliary program, based on a control of the control section 8, after receiving the information from the sending and receiving process section 2. In case that the received information is a piece of image information, the process proceeds to STEP S102. In case that the received information is an auxiliary program, the process proceeds to STEP S105. Here, the process proceeds to STEP S102, because an identifier "@PROGRAM" is not included in the received information shown in FIG. 6.

Step S102

The auxiliary program managing section 4 judges whether there is any auxiliary program already registered in the memory section 1 or not, based on a control of the control section 8. In the present case, a name of an auxiliary program A is set in the auxiliary program managing section 4. Therefore, the process proceeds to STEP S107, because the auxiliary program managing section 4 judges that there is an auxiliary program registered in the memory section 1.

Step S107

The auxiliary program managing section 4 recognizes an identifier of the received image information, based on a control of the control section 8. And, the auxiliary program managing section 4 judges whether the received image information is able to be processed by the auxiliary program A. In case that the received image information is able to be processed, the process proceeds to STEP S108. Otherwise, the process proceeds to STEP S103. In the present case, the received image information is able to be processed, because an identifier "@COMPRESSED" is attached to the image information shown in FIG. 6. Therefore, the process proceeds to STEP S108.

Step S108

The auxiliary program executing section 5 executes the auxiliary program, based on a control of the control section 8. After that, the auxiliary program executing section 5 sends out the image information to the received information judging section 3. Then, the process returns to STEP S100.

Step S100

The received information judging section 3 receives from the auxiliary program executing section 5 the image information which is obtained after the auxiliary program is executed, based on a control of the control section 8. This image information is not attached with an identifier "@COMPRESSED", now. Therefore, the process proceeds to STEP S103 through STEP S101, S102, and S107.

Step S103

When the image data generating process section 6 received a piece of image information from the auxiliary program managing section 4, it transforms the image information into an image data, with using a prescribed program, based on a control of the control section 8.

Step S104

The printing process section 7 performs a printing process, based on a control of the control section 8, after receiving an image data from the image data generating process section 6. And, the process ends.

The operation performed when the process proceeds to STEP S105 from STEP S101, is same as STEP S105 and STEP S106 of FIG. 2, which are already described. Therefore, the same description is omitted.

Figure 7:
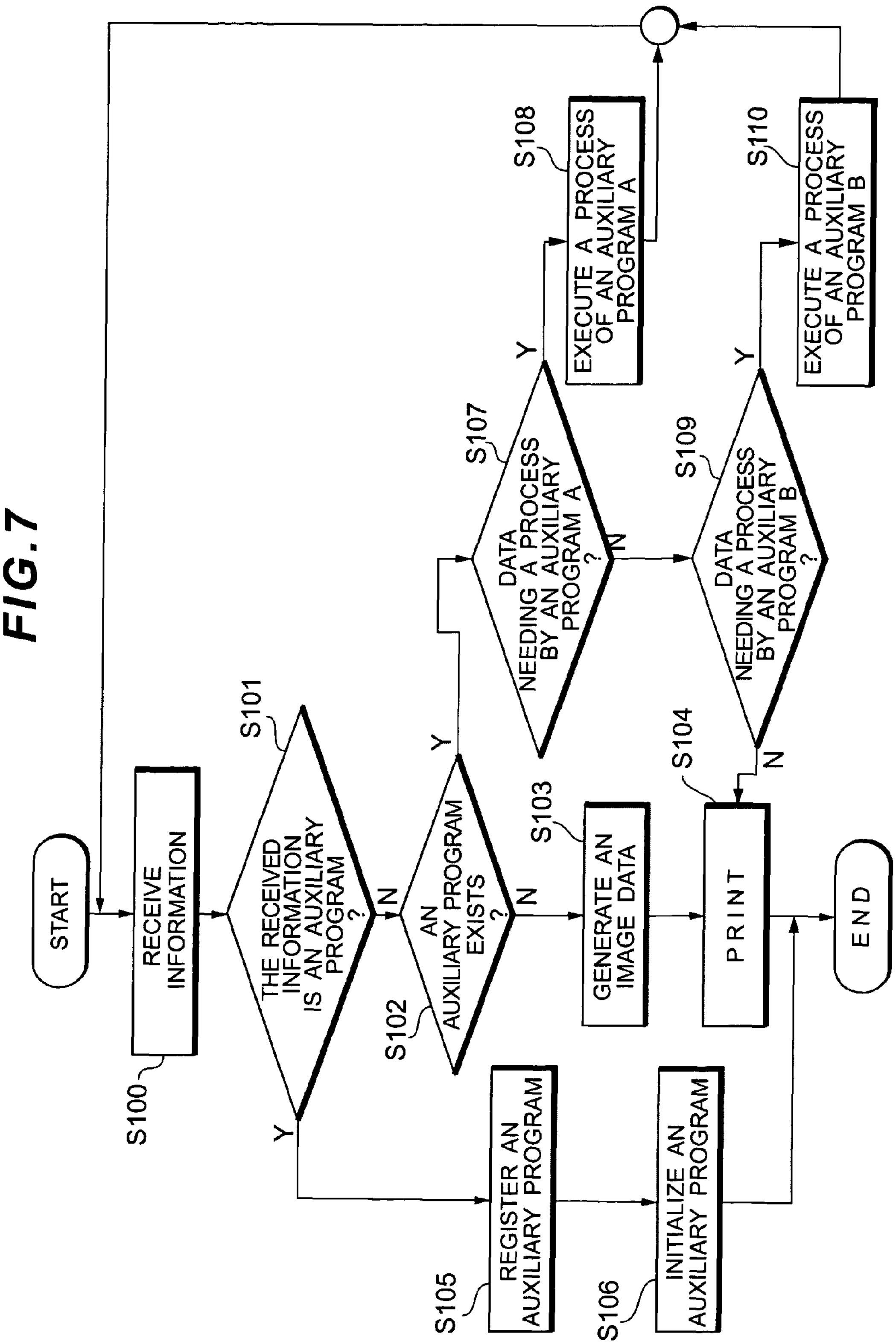
FIG. 7 is a flow chart showing a process of Embodiment 1 performed after an auxiliary program B is added.

FIG. 7 is a flow chart showing a process of Embodiment 1 performed after an auxiliary program B is added.

The flow chart of FIG. 7 is showing an operation in case that an auxiliary program A and an auxiliary program B are already registered in the memory section 1.

Step S100

It is provided that the sending and receiving process section 2 receives a piece of information included an identifier "@COMPRESSED" (needed an auxiliary program A) and an identifier "@CONFIDENTIAL" (needed an auxiliary program B) from the auxiliary program executing section 5, based on a control of the control section 8.

Step S101

The received information judging section 3 judges whether the received information is a piece of image information or an auxiliary program, based on a control of the control section 8, after receiving the information from the sending and receiving process section 2. In case that the received information is a piece of image information, the process proceeds to STEP S102. In case that the received information is an auxiliary program, the process proceeds to STEP S105. Here, the process proceeds to STEP S102, because an identifier "@PROGRAM" is not included in the received information.

Step S102

The auxiliary program managing section 4 judges whether there is any auxiliary program already registered in the memory section 1 or not, based on a control of the control section 8. In the present case, names of an auxiliary program A and an auxiliary program B are set in the auxiliary program managing section 4. Therefore, the process proceeds to STEP S107.

Step S107

The auxiliary program managing section 4 recognizes an identifier of the received image information, based on a control of the control section 8. And, the auxiliary program managing section 4 judges whether the received image information is able to be processed by the auxiliary program A. In case that the received image information is able to be processed, the process proceeds to STEP S108. Otherwise, the process proceeds to STEP S109. In the present case, the received image information is able to be processed, because an identifier "@COMPRESSED" is attached to the image information shown in FIG. 6. Therefore, the process proceeds to STEP S108.

Step S108

The auxiliary program executing section 5 executes the auxiliary program, based on a control of the control section 8. After that, the auxiliary program executing section 5 sends out the image information to the received information judging section 3. Then, the process returns to STEP S100.

Step S100

The received information judging section 3 receives from the auxiliary program executing section 5 the image information which is obtained after the auxiliary program A is executed, based on a control of the control section 8. This image information is not attached with an identifier "@COMPRESSED", now. However, this image information includes "@CONFIDENTIAL". Therefore, the process proceeds to STEP S109 through STEP S101, S102, and S107.

Step S109

The auxiliary program managing section 4 recognizes an identifier of the received image information, based on a control of the control section 8. And, the auxiliary program managing section 4 judges whether the received image information is able to be processed by the auxiliary program B. In case that the received image information is able to be processed, the process proceeds to STEP S110. Otherwise, the process proceeds to STEP S103. In the present case, the received image information is able to be processed, because an identifier "@CONFIDENTIAL" is attached to the image information shown in FIG. 6. Therefore, the process proceeds to STEP S110.

Step S110

The auxiliary program executing section 5 executes the auxiliary program B, based on a control of the control section 8. After that, the auxiliary program executing section 5 sends out the image information to the received information judging section 3. Then, the process returns to STEP S100.

Step S100

The received information judging section 3 receives from the auxiliary program executing section 5 the image information which is obtained after the auxiliary program A and the auxiliary program B are executed, based on a control of the control section 8. This image information is not attached with an identifier "@COMPRESSED" and an identifier "@CONFIDENTIAL", now. Therefore, the process proceeds to STEP S103 through STEP S101, S102, S107 and S109.

Step S103

When the image data generating process section 6 received a piece of image information from the auxiliary program managing section 4, it transforms the image information into an image data, with using a prescribed program, based on a control of the control section 8.

Step S104

The printing process section 7 performs a printing process, based on a control of the control section 8, after receiving an image data from the image data generating process section 6. And, the process ends.

Effects

As described above, according to Embodiment 1, when addition of a new function is requested, only a program of a new requested function is contained in a memory section. Then, a program which is already installed is not changed. Therefore, an effect that addition of a new function are performed easily; because a problem that the current program must be changed for adding new functions, and a problem that changing or adding a great deal of functions in accord with functions of the current program, is difficult, does not occur. Moreover, the auxiliary program A and the auxiliary program B of the above STEP S107 and S109 are executed in an order of the newest time of setting. By this, after an auxiliary program renewed at the latest time is executed, identifiers of the same kind in an image data no longer exist. Then, auxiliary program renewed before the latest time is not executed. Therefore, an effect that renewal of auxiliary programs can be performed easily, is obtained.

Embodiment 2

Configuration

FIG. 8 is a block diagram showing a configuration of Embodiment 2.

As shown in FIG. 8, an image forming apparatus 20 of Embodiment 2, comprises a memory section 1, a sending and receiving process section 2, a received information judging section 3, an auxiliary program executing section 5, an image data generating process section 6, a printing process section 7, a control section 8, and an auxiliary program managing section 14.

Only elements in Embodiment 1, which are different from Embodiment 2, will be described. Elements which are same as Embodiment 1, are designated with the same symbols.

A message requesting section 11 is a section for informing the operator of the information of the image forming apparatus 20, based on a control of the control section 8. Further, it is a section for setting a prescribed matter to the image forming apparatus 20 from the operator. As an input and output device of the information, combination of a conventional LCD panel and a switch, or a touch panel of liquid crystal (neither are not shown in the drawings) is used. Or, moreover, an error report can be inputted through the printing process section 7. Further, sending and receiving of the information of a message by using the information processing apparatus 9, can be performed (This is shown by a doted line in FIG. 8).

The auxiliary program managing section 14 is a section for enabling starting of the message requesting section 11, adding to the function of Embodiment 1, when an auxiliary program needed for a preparatory process included in the image information is not registered. In order to perform this function quickly and firmly, an auxiliary program managing table 141 is provided inside of the auxiliary program managing section 14.

FIG. 9 is an example of an auxiliary program management table of Embodiment 2.

As shown in FIG. 9, each identifier of auxiliary programs and each address in the memory section 1 corresponding to each identifier, are memorized in the auxiliary program management table 141.

The other elements are same as Embodiment 1. Therefore, the description is omitted.

Operation

An operation of Embodiment 2 will be described.

FIG. 10 is a flow chart showing a process of a main operation of Embodiment 2.

Figure 11:
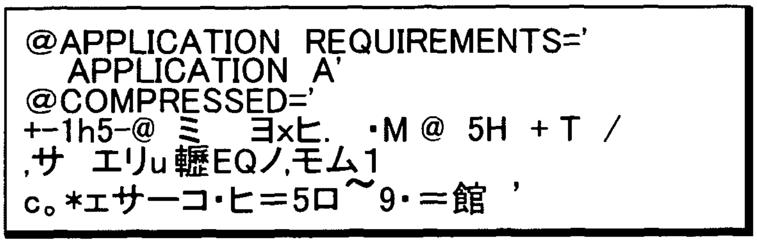
FIG. 11 is an example of a piece of received information of Embodiment 2.

FIG. 11 is an example of a piece of received information of Embodiment 2.

Figure 12:
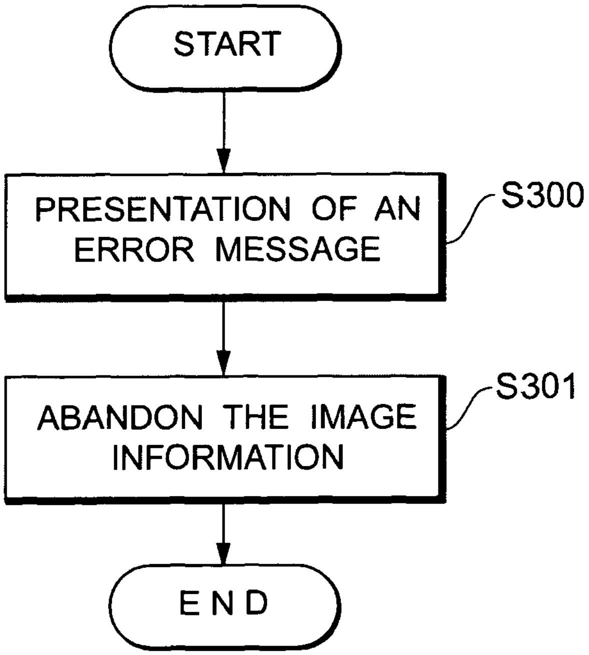
FIG. 12 is a flow chart showing a process of Embodiment 2 performed when an auxiliary program is not registered.

FIG. 12 is a flow chart showing a process of Embodiment 2 performed when an auxiliary program is not registered.

Figure 13:
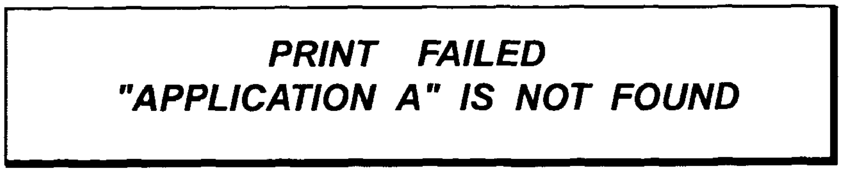
FIG. 13 is an example of an error message.

FIG. 13 is an example of an error message.

Figure 14:
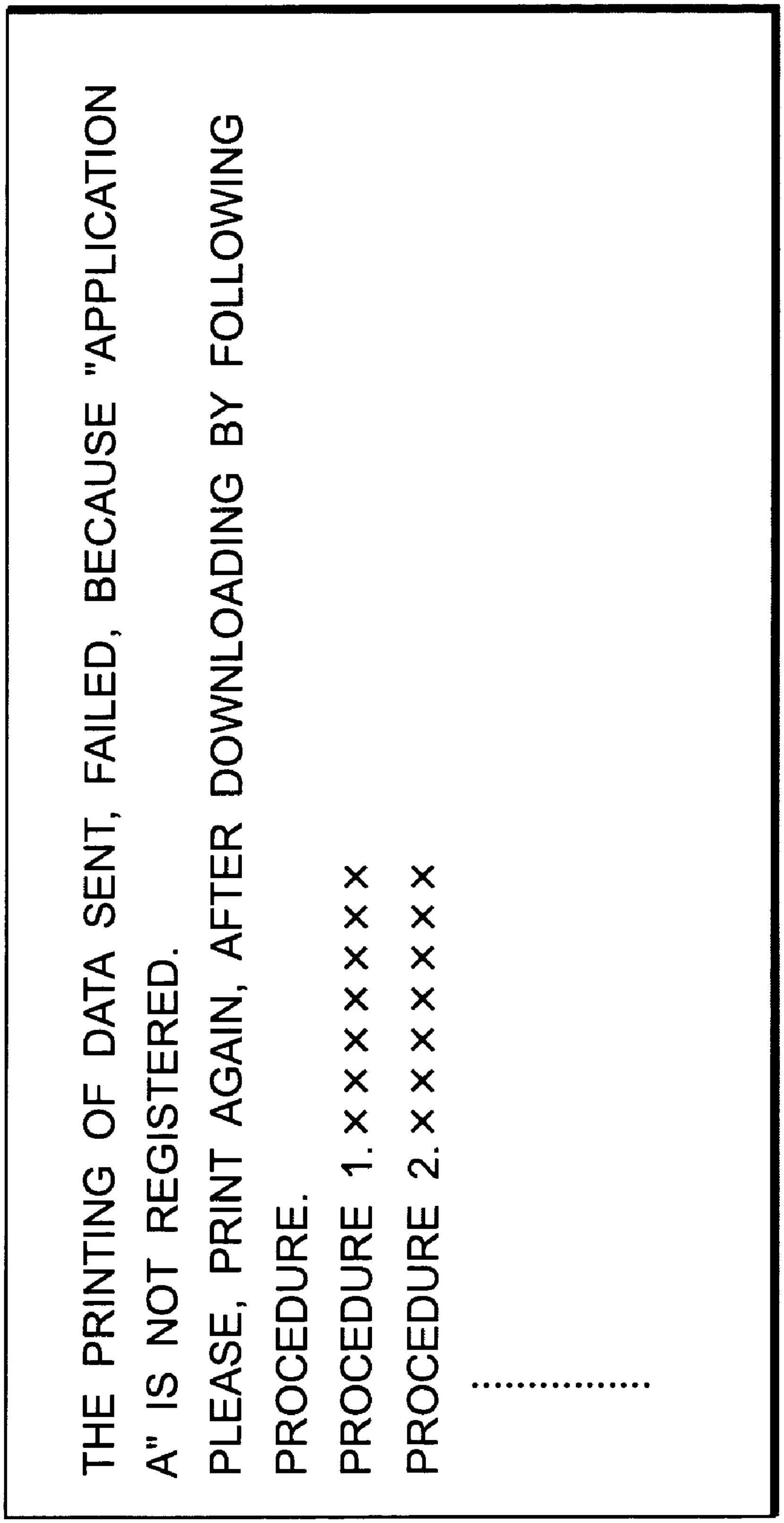
FIG. 14 is an example of an error report.

FIG. 14 is an example of an error report.

The flow chart of FIG. 10 is showing a process of informing an operator by using the message requesting section 11 that the necessary auxiliary program A is not registered, when a sending and receiving process section 2 receives a piece of information needing a preparatory process by the auxiliary program A, though an auxiliary program B (APPLICATION B of FIG. 9) is registered but the auxiliary program A is not registered in the memory section 1.

Step S200

The sending and receiving process section 2 receives a piece of information shown in FIG. 11 from the information processing apparatus 9, based on a control of the control section 8.

Step S201

The received information judging section 3 judges whether the received information is a piece of image information or an auxiliary program, based on a control of the control section 8, after receiving the information from the sending and receiving process section 2. In case that the received information is a piece of image information, the process proceeds to STEP S202. In case that the received information is an auxiliary program, the process proceeds to STEP S205. Here, the process proceeds to STEP S202, because an identifier "@PROGRAM" is not included in the received information shown in FIG. 11.

Step S202

When the received information judging section 3 judged that the received information is a piece of image information, the auxiliary program managing section 14 recognizes from the received information that APPLICATION A is needed for the preparatory process, based on a control of the control section 8. Then, the auxiliary program managing section 14 searches the auxiliary program managing table of FIG. 9, so as to judge whether APPLICATION A is registered or not. In case that APPLICATION A is registered, the process proceeds to STEP S207. In case that APPLICATION A is not registered, the process proceeds to STEP S209. Here, provided that APPLICATION A is not registered, the process proceeds to STEP S209.

Step S209

The message requesting section 11 performs a process performed when the auxiliary program is not registered, based on a control of the control section 8.

Step S300

The message requesting section 11 presents an error message of FIG. 13 at a conventional LCD panel etc. not shown in the drawings, based on a control of the control section 8.

Step S301

The auxiliary program managing section 14 ends the process, based on a control of the control section 8, with abandoning the image information.

Contrary to the above provision, in case that the process proceeded to STEP S207 at STEP S202, it is the same case as the case that the process proceeded to STEP S107 at STEP S102. So, the description is omitted. Moreover, contrary to the above provision, in case that the process proceeded to STEP S205 at STEP S201, it is the same case as the case that the process proceeded to STEP S105 at STEP S102. So, the description is omitted.

Incidentally, at STEP S300 mentioned above, the message requesting section 11 can put out an error report as shown in FIG. 14 via the printing process section 7, instead of presenting an error message. Or, moreover, the error message can be a process of sending and receiving a piece of error information by using the information processing apparatus 9 (shown by a dotted line in the drawing).

Effects

As described above, according to Embodiment 2, in case that the apparatus received the information needing non-registered auxiliary program, an effect that it becomes possible to inform an operator by using a message requesting section that the auxiliary program is not registered, is obtained.

Embodiment 3

Configuration

Configuration of Embodiment 3 is same as Embodiment 2. So, the description is omitted. And, only an operation will be described.

Operation

FIG. 15 is a flow chart showing a process of an operation of Embodiment 3.

The flow chart of FIG. 15 is showing a process of informing an operator by using the message requesting section 11 that the necessary auxiliary program A is not registered, when, as same as Embodiment 2, a sending and receiving process section 2 receives a piece of information needing a preparatory process by the auxiliary program A, though an auxiliary program B is registered but the auxiliary program A is not registered in the memory section 1. And, the operator selects a process performed after that.

An operation of Embodiment 3 will be described, referring to FIG. 15 with FIG. 8, FIG. 9 and FIG. 11.

Step S500

The sending and receiving process section 2 receives a piece of information shown in FIG. 11 from the information processing apparatus 9, based on a control of the control section 8.

Step S501

The received information judging section 3 judges whether the received information is a piece of image information or an auxiliary program, based on a control of the control section 8, after receiving the information from the sending and receiving process section 2. In case that the received information is a piece of image information, the process proceeds to STEP S502. In case that the received information is an auxiliary program, the process proceeds to STEP S505. Here, the process proceeds to STEP S502, because an identifier "@PROGRAM" is not included in the received information shown in FIG. 11.

Step S502

When the received information judging section 3 judged that the received information is a piece of image information, the auxiliary program managing section 14 recognizes from the received information that APPLICATION A is needed for the preparatory process, based on a control of the control section 8. Then, the auxiliary program managing section 14 searches the auxiliary program managing table of FIG. 9, so as to judge whether APPLICATION A is registered or not. In case that APPLICATION A is registered, the process proceeds to STEP S507. In case that APPLICATION A is not registered, the process proceeds to STEP S511. Here, provided that APPLICATION A is not registered, the process proceeds to STEP S511.

Step S511

The message requesting section 11 puts out a message of letting an operator select whether he will abandon the image information or he will add a necessary auxiliary program, at a conventional LCD panel etc. not shown in the drawings, based on a control of the control section 8. Then, the process halts until the operator performs the selection.

Step S512

In case that the operator selected abandoning, the process proceeds to STEP S513. In case that the operator did not select abandoning, the process proceeds to STEP S514.

Step S513

The auxiliary program managing section 14 ends the process, based on a control of the control section 8, with abandoning the image information.

Step S514

The process returns to STEP S500 after the auxiliary program is downloaded.

Contrary to the above provision, in case that the process proceeded to STEP S507 at STEP S502, it is the same case as the case that the process proceeded to STEP S107 at STEP S102. So, the description is omitted. Moreover, contrary to the above provision, in case that the process proceeded to STEP S505 at STEP S501, it is the same case as the case that the process proceeded to STEP S105 at STEP S102. So, the description is omitted.

Incidentally, at STEP S300 mentioned above, the message requesting section 11 can put out an error report as shown in FIG. 14 via the printing process section 7, instead of presenting an error message.

Effects

As described above, according to Embodiment 3, in case that the apparatus received the information needing non-registered auxiliary program, an effect that the information sent by himself is not abandoned against his will, is obtained, by informing an operator with a message requesting section that the auxiliary program is not registered, and letting the operator select a process performed after that.

Embodiment 4

Configuration

Configuration of Embodiment 4 is same as Embodiment 2. So, the description is omitted. And, only an operation will be described.

Operation

Figure 16:
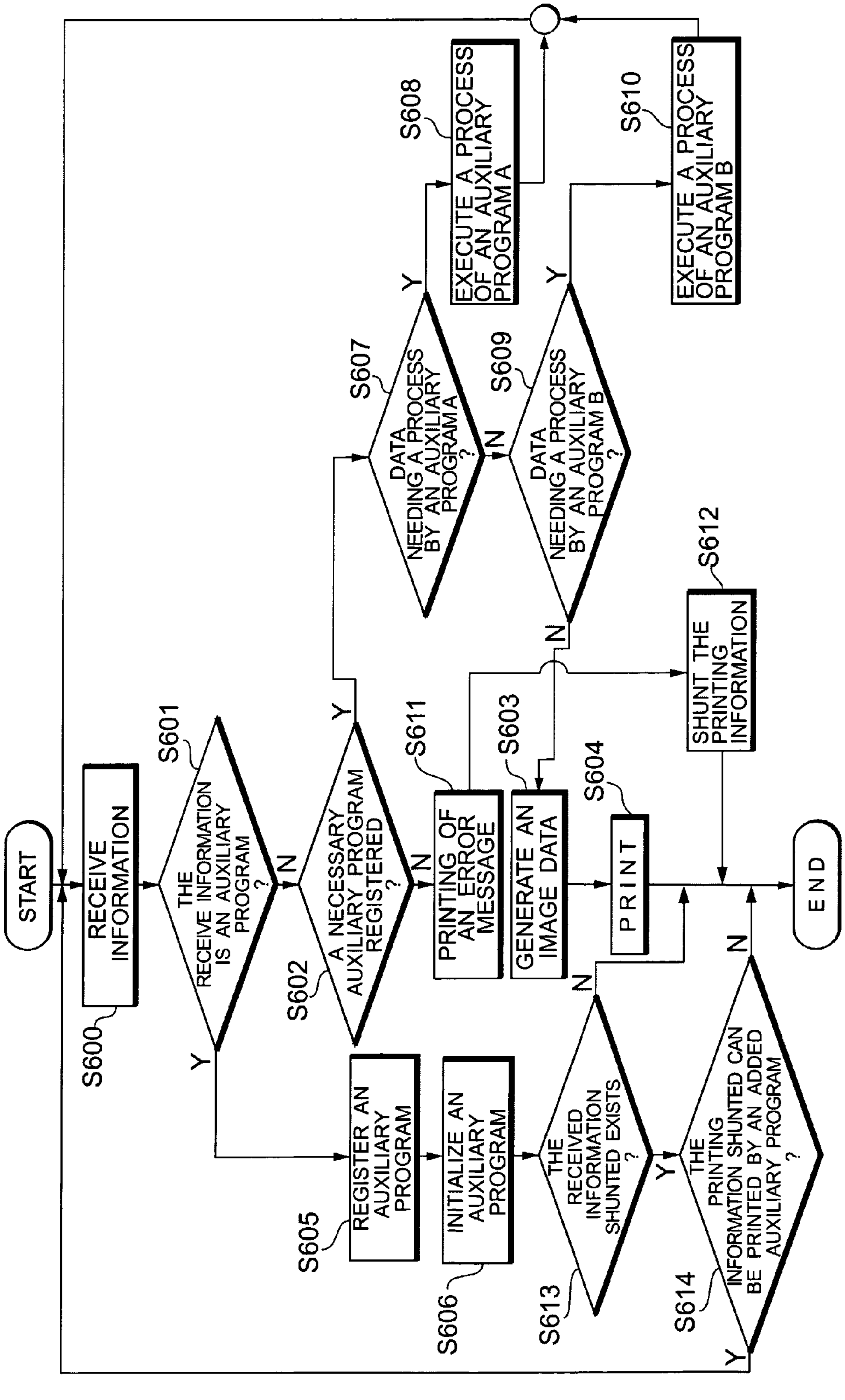
FIG. 16 is a flow chart showing a process of an operation of Embodiment 4.

FIG. 16 is a flow chart showing a process of an operation of Embodiment 4.

The flow chart of FIG. 16 is showing a process of informing an operator by using the message requesting section 11 that the necessary auxiliary program A is not registered, when, as same as Embodiment 2 and Embodiment 3, a sending and receiving process section 2 receives a piece of information needing a preparatory process by the auxiliary program A, though an auxiliary program B is registered but the auxiliary program A is not registered in the memory section 1. And, the received information is shunted until a necessary auxiliary program is registered.

An operation of Embodiment 4 will be described, referring to FIG. 16 with FIG. 8, FIG. 9 and FIG. 11.

Step S600

The sending and receiving process section 2 receives a piece of information shown in FIG. 11 from the information processing apparatus 9, based on a control of the control section 8.

Step S601

The received information judging section 3 judges whether the received information is a piece of image information or an auxiliary program, based on a control of the control section 8, after receiving the information from the sending and receiving process section 2. In case that the received information is a piece of image information, the process proceeds to STEP S602. In case that the received information is an auxiliary program, the process proceeds to STEP S605. Here, the process proceeds to STEP S602, because an identifier "@PROGRAM" is not included in the received information shown in FIG. 11.

Step S602

When the received information judging section 3 judged that the received information is a piece of image information, the auxiliary program managing section 14 recognizes from the received information that APPLICATION A (corresponding to an initializing program A) is needed for the preparatory process, based on a control of the control section 8. Then, the auxiliary program managing section 14 searches the auxiliary program managing table of FIG. 9, so as to judge whether APPLICATION A is registered or not. In case that APPLICATION A is registered, the process proceeds to STEP S607. In case that APPLICATION A is not registered, the process proceeds to STEP S611. Here, provided that APPLICATION A is not registered, the process proceeds to STEP S611. Contrary to the above provision, in case that the process proceeded to STEP S607, it is the same case as the case that the process proceeded to STEP S107 at STEP S102 in FIG. 7 described above. So, the description is omitted.

Step S611

The message requesting section 11 puts out by printing an error report informing the operator via the printing process section 7 that an auxiliary program A is not registered.

Step S612

The auxiliary program managing section 14 ends the process, based on a control of the control section 8, with shunting the image information, until an auxiliary program A is received. After this, when an auxiliary program A is received from the information processing apparatus 9, the process proceeds to STEP S613 via STEP S601, S605, and S606. Here, STEP S600, S601, S605, and S606 are same as STEP S100, S101, S105, and S106 of FIG. 1 described before. So, the description is omitted.

Step S613

The auxiliary program managing section 14 judges whether there is a piece of image information shunted in the memory section 1 or not, based on a control of the control section 8, after initializing an auxiliary program A. In case that there is a piece of image information shunted in the memory section 1, the process proceeds to STEP S614. In case that there is not a piece of image information shunted in the memory section 1, the process ends. Here, the process proceeds to STEP S614, because there is a piece of image information shunted in the memory section 1 at STEP S612.

Step S614

The auxiliary program managing section 14 judges whether the added auxiliary program (Here, the auxiliary program A) corresponds to an auxiliary program needed by a piece of image information shunted in the memory section 1 or not, based on a control of the control section 8. In case that the added auxiliary program corresponds to a piece of image information shunted in the memory section 1, the process returns to STEP S600, so as to perform a process of received information again. In case that the added auxiliary program does not correspond to a piece of image information shunted in the memory section 1, the process ends.

Effects

As described above, according to Embodiment 4, in case that the apparatus received the information needing non-registered auxiliary program, an effect that the process can be started again, by receiving an necessary auxiliary program from an operator after informing the operator with a message requesting section that the auxiliary program is not registered, is obtained.

Embodiment 5

Configuration

Figure 17:
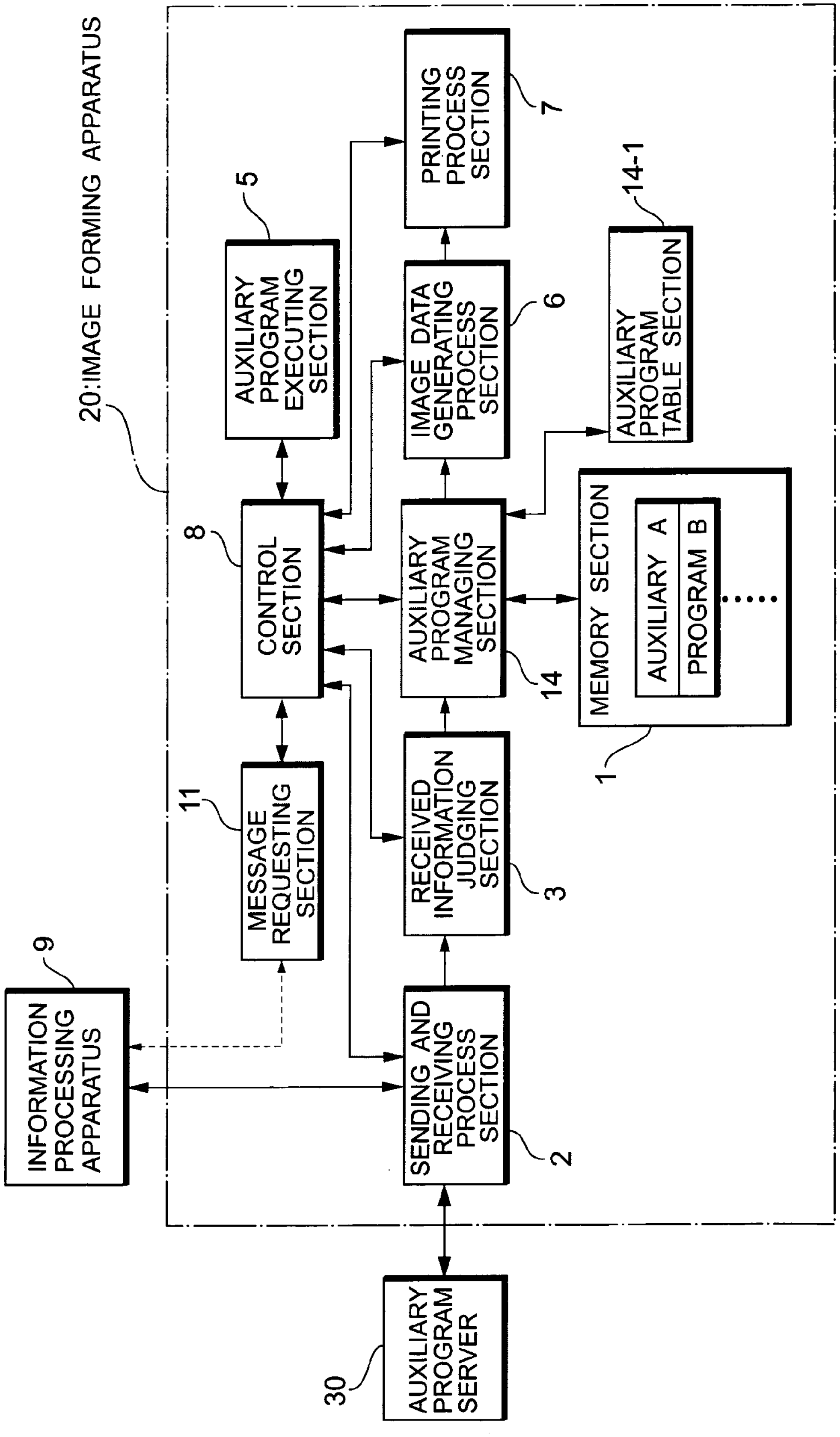
FIG. 17 is a block diagram showing a configuration of Embodiment 5.

FIG. 17 is a block diagram showing a configuration of Embodiment 5.

As shown in FIG. 17, an image forming apparatus 20 of Embodiment 5 is almost same as the image forming apparatus 20 of Embodiment 2. An only different point from Embodiment 2 is an auxiliary program server 30, which is provided other than the information processing apparatus 9, as an outer apparatus, that operates when the image forming apparatus 20 operates. Here, the auxiliary program server 30 is a server where auxiliary programs to be needed for processing the received information are registered beforehand.

Operation

Hereafter, an operation of Embodiment 5 will be described.

Figure 18:
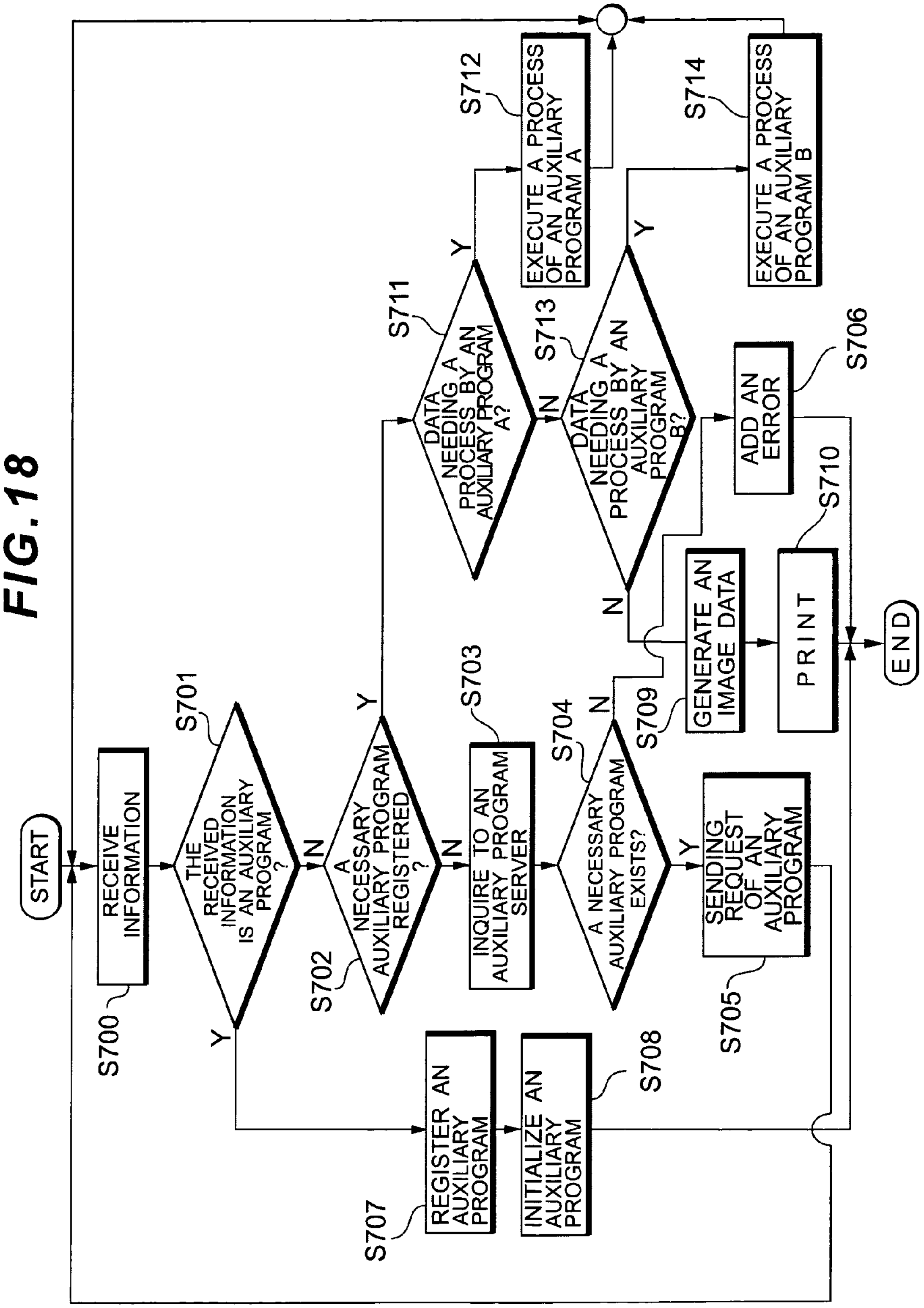
FIG. 18 is a flow chart showing a process of an operation of Embodiment 5.

FIG. 18 is a flow chart showing a process of an operation of Embodiment 5.

The flow chart of FIG. 18 is showing a process of inquiring of an auxiliary program server 30 whether a necessary auxiliary program A is registered or not, when, as same as Embodiment 2 to Embodiment 4, a sending and receiving process section 2 receives a piece of information needing a preparatory process by the auxiliary program A, though an auxiliary program B is registered but the auxiliary program A is not registered in the memory section 1. And, in case that a necessary auxiliary program A is registered in the auxiliary program server 30, the auxiliary program A is received from the auxiliary program server 30, so as to perform a process for the received information.

An operation of Embodiment 5 will be described, referring to FIG. 18 with FIG. 9, FIG. 11 and FIG. 17.

Step S700

The sending and receiving process section 2 receives a piece of information shown in FIG. 11 from the information processing apparatus 9, based on a control of the control section 8.

Step S701

The received information judging section 3 judges whether the received information is a piece of image information or an auxiliary program, based on a control of the control section 8, after receiving the information from the sending and receiving process section 2. In case that the received information is a piece of image information, the process proceeds to STEP S702. In case that the received information is an auxiliary program, the process proceeds to STEP S707. Here, the process proceeds to STEP S702, because an identifier "@PROGRAM" is not included in the received information shown in FIG. 11.

Step S702

When the received information judging section 3 judged that the received information is a piece of image information, the auxiliary program managing section 14 recognizes from the received information that APPLICATION A (corresponding to an initializing program A) is needed for the preparatory process, based on a control of the control section 8. Then, the auxiliary program managing section 14 searches the auxiliary program managing table of FIG. 9, so as to judge whether APPLICATION A is registered or not. In case that APPLICATION A is registered, the process proceeds to STEP S711. In case that APPLICATION A is not registered, the process proceeds to STEP S703. Here, provided that APPLICATION A is not registered, the process proceeds to STEP S703.

Step S703

The sending and receiving process section 2 inquires of an auxiliary program server 30 whether a necessary auxiliary program A is registered or not, based on a control of the control section 8.

Step S704

In case that a necessary auxiliary program A is registered in the auxiliary program server 30, the process proceeds to STEP S705. Otherwise, the process proceeds to STEP S706.

Step S705

The sending and receiving process section 2 demands a necessary auxiliary program A to an auxiliary program server 30, based on a control of the control section 8. Then, the process proceeds to STEP S706.

Step S706

The message requesting section 11, based on a control of the control section 8, puts out an error message informing the operator by presenting at a conventional LCD panel etc. that a necessary auxiliary program A is not registered. Then, the process ends.

Contrary to the above provision, in case that the process proceeded to STEP S711 at STEP S702, it is the same case as the case that the process proceeded to STEP S107 at STEP S102. So, the description is omitted. Moreover, contrary to the above provision, in case that the process proceeded to STEP S705 at STEP S701, it is the same case as the case that the process proceeded to STEP S105 at STEP S102. So, the description is omitted.

Effects

As described above, according to Embodiment 5, even in case that a necessary auxiliary program is not registered in the memory section 1, an effect that an necessary auxiliary program can be received from an auxiliary program server, so as to continue a process, is obtained.

Embodiment 6

Configuration

Configuration of Embodiment 6 is same as Embodiment 2. So, the description is omitted. And, only an operation will be described.

Operation

Figure 19:
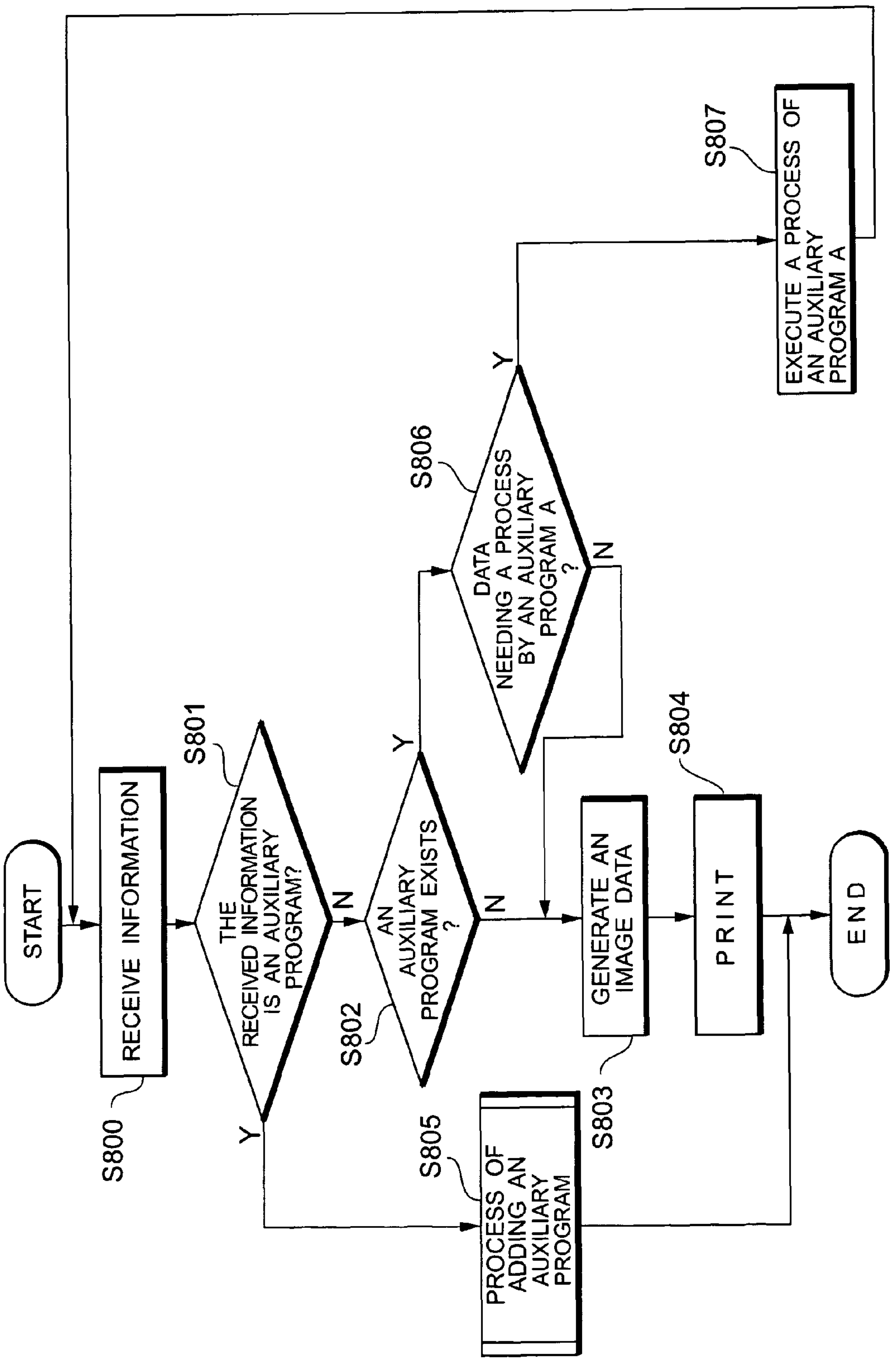
FIG. 19 is a flow chart showing a process of a main operation of Embodiment 6.

FIG. 19 is a flow chart showing a process of a main operation of Embodiment 6.

Figure 20:
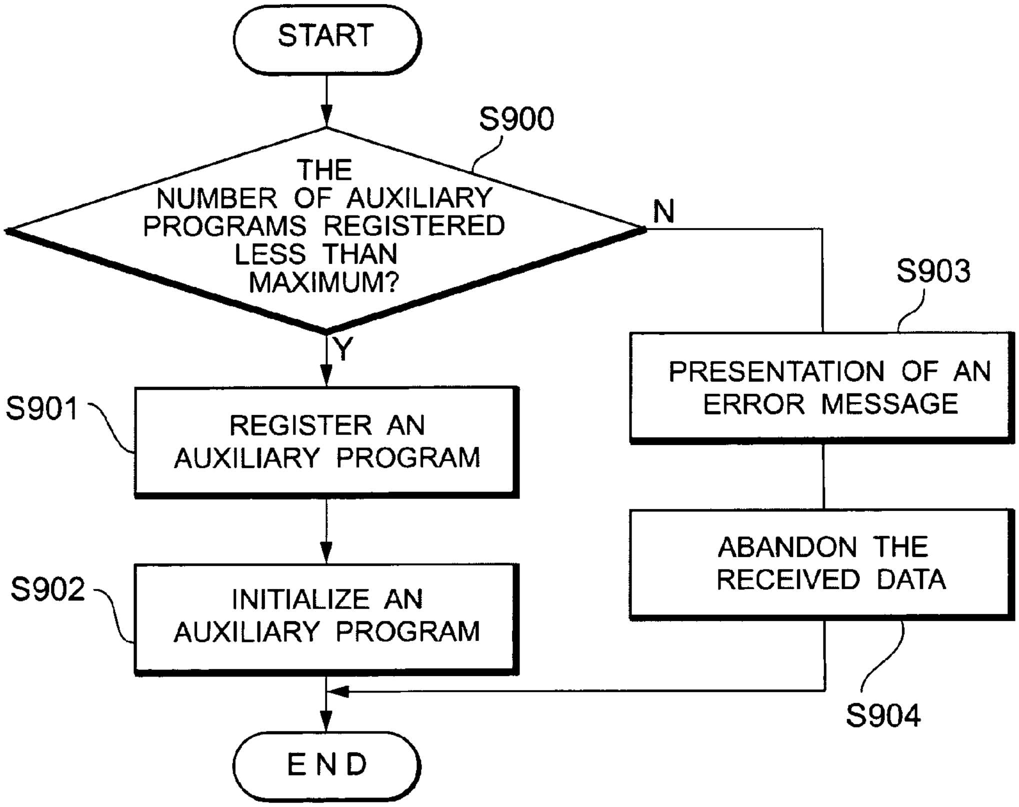
FIG. 20 is a flow chart showing a process of Embodiment 6 performed when an auxiliary program is registered.

FIG. 20 is a flow chart showing a process of Embodiment 6 performed when an auxiliary program is registered.

Figure 21:
FIG. 21 is an example of an error message of Embodiment 6.

FIG. 21 is an example of an error message of Embodiment 6.

The flow chart of FIG. 19 is showing a process of adding other auxiliary programs to the memory section 1 where an auxiliary program A is registered.

Step S800

The sending and receiving process section 2 receives a piece of information from the information processing apparatus 9, based on a control of the control section 8.

Step S801

The received information judging section 3 judges whether the received information is a piece of image information or an auxiliary program, based on a control of the control section 8, after receiving the information from the sending and receiving process section 2. In case that the received information is a piece of image information, the process proceeds to STEP S802. In case that the received information is an auxiliary program, the process proceeds to STEP S805. As described before, in case that the received information includes an identifier "@PROGRAM", the process proceeds to STEP S805. And, in case that the received information does not include an identifier "@PROGRAM", the process proceeds to STEP S802. Here, the process proceeds to a step of adding an auxiliary program of STEP S805, provided that an identifier "@PROGRAM" is included in the received information.

Step S900

The auxiliary program managing section 14 searches the auxiliary program managing table 141, based on a control of the control section 8, so as to detect the number of auxiliary programs already registered and the number of capacity of registering auxiliary programs. Then, the auxiliary program managing section 14 compares the number of auxiliary programs already registered with the number of capacity of registering auxiliary programs, so as to judge whether a new auxiliary program can be registered or not. In case that a new auxiliary program can be registered, the process proceeds to STEP S901. In case that a new auxiliary program cannot be registered, the process proceeds to STEP S903.

Step S901

The auxiliary program managing section 14 registers an auxiliary program in the memory section 1, based on a control of the control section 8, and it sets an identifier of the new auxiliary program to the auxiliary program managing table 141.

Step S902

The auxiliary program managing section 14 initializes an auxiliary program, based on a control of the control section 8. Then, the process ends.

Step S903

The message requesting section 11, based on a control of the control section 8, presents an error message shown in FIG. 21 (an example) at a conventional LCD panel etc. Then, the process proceeds to a next step.

Step S904

The auxiliary program managing section 14 abandons the received auxiliary program, based on a control of the control section 8. Then, the process ends.

Effects

As described above, according to Embodiment 6, an effect that auxiliary programs are not limitlessly added to a memory section, is obtained. Then, functions of the image forming apparatus 20, such as SPOOL printing or certificated printing etc. are not disabled.

Embodiment 7

Configuration

Configuration of Embodiment 7 is same as Embodiment 2. So, the description is omitted. And, only an operation will be described.

Operation

Figure 22:
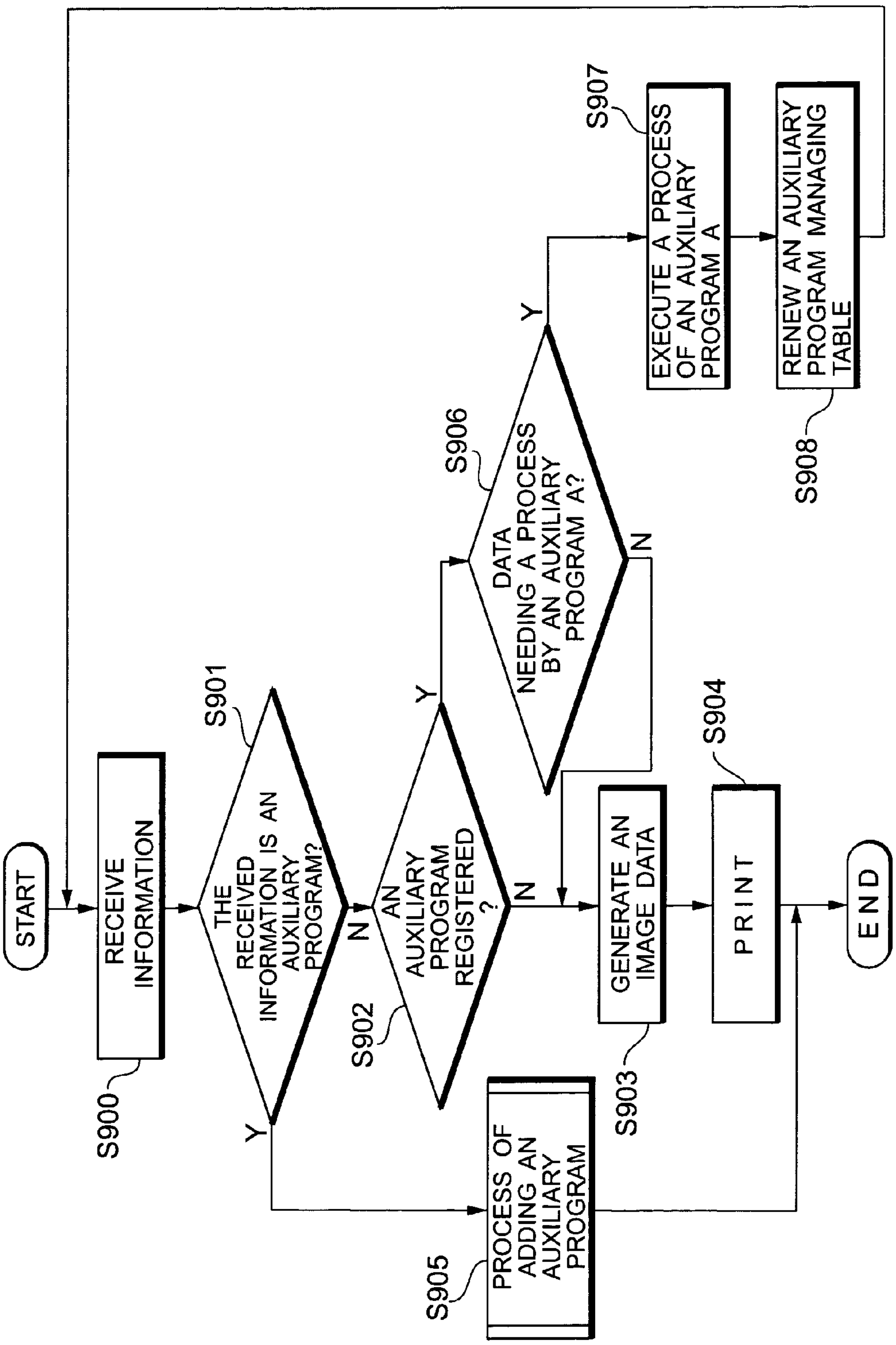
FIG. 22 is a flow chart showing a process of a main operation of Embodiment 7.

FIG. 22 is a flow chart showing a process of a main operation of Embodiment 7.

Figures 23, 24:
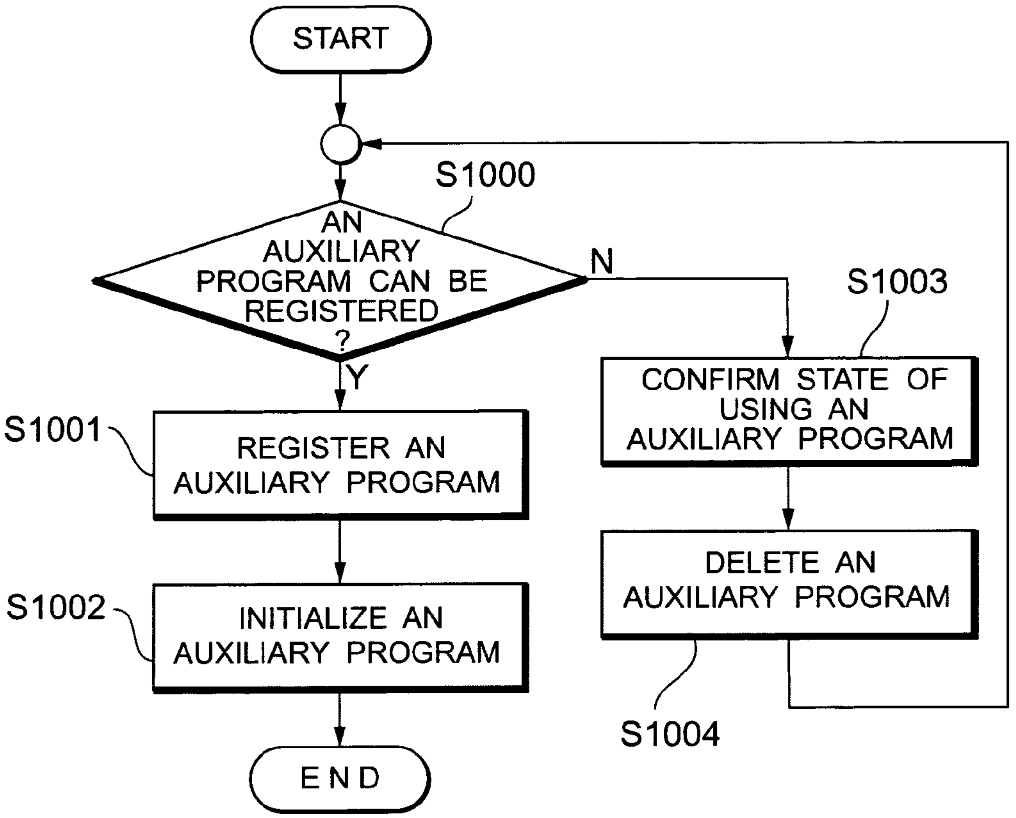
FIG. 23 is a flow chart showing a process of Embodiment 7 performed when an auxiliary program is registered.
FIG. 24 is an example of an auxiliary program management table of Embodiment 7.

FIG. 23 is a flow chart showing a process of Embodiment 7 performed when an auxiliary program is registered.

FIG. 24 is an example of an auxiliary program management table of Embodiment 7.

The flow chart of FIG. 22 is showing a process of renewing an auxiliary program managing table 141 when a process of an auxiliary program A is performed, and a process of adding other auxiliary programs to the memory section 1, in case that an auxiliary program A is registered in the memory section 1.

Step S900

The sending and receiving process section 2 receives a piece of information shown in FIG. 6 from the information processing apparatus 9, based on a control of the control section 8.

Step S901

The received information judging section 3 judges whether the received information is a piece of image information or an auxiliary program, based on a control of the control section 8, after receiving the information from the sending and receiving process section 2. In case that the received information is a piece of image information, the process proceeds to STEP S902. In case that the received information is an auxiliary program, the process proceeds to STEP S905. Here, the process proceeds to STEP S902, because an identifier "@PROGRAM" is not included in the received information shown in FIG. 6.

Step S902

The auxiliary program managing section 4 judges whether there is any auxiliary program already registered in the memory section 1 or not, based on a control of the control section 8. In the present case, an auxiliary program A is set in the auxiliary program managing table 141. Therefore, the process proceeds to STEP S906.

Step S906

The auxiliary program managing section 14 recognizes an identifier of the received image information, based on a control of the control section 8. And, the auxiliary program managing section 14 judges whether the received image information is able to be processed by the auxiliary program A. In case that the received image information is able to be processed, the process proceeds to STEP S907. Otherwise, the process proceeds to STEP S903. In the present case, the received image information is able to be processed, because an identifier "@COMPRESSED" is attached to the image information shown in FIG. 6. Therefore, the process proceeds to STEP S907.

Step S907

The auxiliary program executing section 5 executes the auxiliary program, based on a control of the control section 8. After that, the auxiliary program executing section 5 sends out the image information to the received information judging section 3. Then, the process returns to STEP S900. In this case, the auxiliary program managing section 14 renews auxiliary program managing table 141 shown in FIG. 24 by incrementing the number of times of using the auxiliary program A, based on a control of the control section 8. Succeedingly, a case that the process proceeds to a process of adding an auxiliary program of STEP S901 to STEP S905 shown in FIG. 23, will be described.

The auxiliary program executing section 5 compares the data size of the received auxiliary program with the capacity of vacancy of the memory section 1, based on a control of the control section 8. Then, the auxiliary program executing section 5 judges whether the received auxiliary program can be registered or not. In case that the received auxiliary program can be registered, the process proceeds to STEP S1001. In case that the received auxiliary program cannot be registered, the process proceeds to STEP S1003.

Step S1001

The auxiliary program managing section 14 registers an auxiliary program in the memory section 1, based on a control of the control section 8, and it sets an identifier of the new auxiliary program to the auxiliary program managing table 141.

Step S1002

The auxiliary program managing section 14 initializes an auxiliary program, based on a control of the control section 8. Then, the process ends.

Step S1003

The auxiliary program managing section 14 refers to the number of the times of using in the auxiliary program managing table 141, based on a control of the control section 8.

Step S1004

The auxiliary program managing section 14 deletes an auxiliary program whose number of the times of using is minimum, based on a control of the control section 8. Then, the process returns to STEP S1000.

Effects

As described above, according to Embodiment 7, an inconvenience that auxiliary programs cannot be added to a memory section because of a lack of memory capacity, then, printing cannot be performed etc., is avoided. Moreover, an effect that it becomes to continue to use an auxiliary program without doing laborious operation of confirming the capacity of the memory section periodically and deleting useless auxiliary program, is obtained.

Other Embodiments

Although, in the description mentioned above, a case that the present invention is applied to a printing apparatus, is described; That is, the invention can be applied to a facsimile etc.

What is claimed is:

1. An image forming apparatus configured to execute an auxiliary program combined to a prescribed control program that transforms a piece of received information to image data, wherein the image forming apparatus comprises:

a memory section containing a plurality of auxiliary programs;

a received information judging section configured to judge whether the received information is an auxiliary program or a piece of image information, by analyzing said received information;

an auxiliary program managing section configured to (i) detect from said memory section a necessary auxiliary program from the plurality of auxiliary programs in order for the received information to be processed, based on the image information, when said received information is the image information, and (ii) register the received information in said memory section, when said received information is a new auxiliary program;

a received information memorizing section configured to memorize the received information when said necessary auxiliary program is not detected by the auxiliary program managing section;

a control section configured to (i) shunt the received information in the memory section if the necessary auxiliary program is not detected by the auxiliary program managing section and to start a next process of a subsequently received information, when the received information is memorized, and (ii) transform the received information to image data if the necessary auxiliary program is detected by the auxiliary program managing section, wherein the received information is not shunted if the necessary auxiliary program is detected by the auxiliary program managing section; and an adding auxiliary program selecting section configured to judge whether or not the new auxiliary program is needed by the received information in the received information memorizing section at a time when the new auxiliary program is registered in the memory section and to select said received information to be processed from the received information memorizing section, if the new auxiliary program is needed by said selected received information, wherein the control section executes a process of the selected received information by using the new auxiliary program immediately after the new auxiliary program is registered.

2. An image forming apparatus according to the claim 1, wherein said auxiliary program managing section contains the necessary auxiliary program in said memory section when said received information is said image information.

3. An image forming apparatus according to the claim 1, further comprising an auxiliary program executing section for executing said necessary auxiliary program, and sending to said received information judging section the image information obtained after executing said necessary auxiliary program, when said auxiliary program managing section detects said necessary auxiliary program from said memory section.

4. An image forming apparatus according to the claim 1, further comprising a message requesting section for requesting that the necessary auxiliary program be added in said memory section, when said auxiliary program managing section does not detect said necessary auxiliary program.

5. An image forming apparatus according to the claim 1, further comprising a judging section for judging whether said received information to be processed by said auxiliary program should be stopped or not, when said necessary auxiliary program is not detected by said auxiliary program managing section.

6. An image forming apparatus according to the claim 5, further comprising a sending and receiving process section for requesting to an auxiliary program server where the necessary auxiliary program is contained beforehand, to send the necessary auxiliary program to be received, when said auxiliary program managing section does not detect said necessary auxiliary program.

7. An image forming apparatus according to the claim 6, further comprising an informing section for informing that said necessary auxiliary program does not exist in said auxiliary program server.

8. An image forming apparatus according to the claim 1, further comprising an auxiliary program registering judging section for judging whether said auxiliary program is able to be registered or not before registering said auxiliary program.

9. An image forming apparatus according to the claim 8, further comprising an error message outputting section for outputting an error message when said auxiliary program registering judging section judges that said auxiliary program cannot be registered.

10. An image forming apparatus according to the claim 8, further comprising an auxiliary program abandoning section for abandoning said auxiliary program when said auxiliary program registering judging section judges that said auxiliary program cannot be registered.

11. An image forming apparatus according to the claim 1, wherein said memory section memorizes plural identifiers for identifying each of said plurality of auxiliary programs; and wherein said auxiliary program managing section comprises an individual judging section for judging each of said plurality of auxiliary programs as to whether or not a process by at least one of said plurality of auxiliary programs is necessary for said received information.

12. An image forming apparatus according to the claim 1, wherein said auxiliary program managing section abandons said received information, when said auxiliary program managing section does not detect said necessary auxiliary program.

13. An image forming apparatus according to the claim 3, wherein said auxiliary program managing section further comprises an auxiliary program managing table for memorizing an accumulated sum of the number of times of executing each auxiliary program which is executed by said auxiliary program executing section.

14. An image forming apparatus according to the claim 13, wherein when said received information is an auxiliary program, said auxiliary program managing section refers to said auxiliary program managing table, in order to abandon at least one of said plurality of auxiliary programs whose accumulated sum of the number of times of execution is minimal, in order to contain said auxiliary program of said received information in said memory section.

15. An image forming method which performs an image forming with a control program, the image forming method comprising steps of:

storing a plurality of auxiliary programs in a memory section;

receiving a piece of information from a host device;

judging whether the received information is a piece of image information or an auxiliary program;

detecting a necessary auxiliary program from the memory section for the received information to be processed, based on an identifying information included in the image information, when said received information is the image information, or registering the received information in said memory section when said received information is a new auxiliary program;

memorizing the received information in a received information memorizing section when said necessary auxiliary program is not detected in the detecting step;

shunting the received information if the necessary auxiliary program is not detected in the detecting step and repeating the receiving step, after the received information is memorized in the memorizing step, and not shunting the received information if the necessary auxiliary program is detected in the detecting step;

judging whether or not the new auxiliary program is needed by the received information in the received information memorizing section at a time when the new auxiliary program is registered in the memory section;

selecting said received information to be processed from the received information memorizing section, if the new auxiliary program is needed by said selected received information;

making a combined program by combining (i) said control program, and (ii) at least one of said necessary auxiliary program, or said new auxiliary program, if the new auxiliary program is needed; and forming an image from said received information using said combined program.

16. An image forming apparatus according to claim 1, further comprising a message requesting section to output an error report informing of a name of said necessary auxiliary program when the necessary auxiliary program is not detected by the auxiliary program managing section.

17. The image forming method of claim 15, further comprising the step of outputting an error report that includes information of a name of said necessary auxiliary program when the necessary auxiliary program is not detected.

* * * * *